US010547791B2

(12) United States Patent
Ohno

(10) Patent No.: US 10,547,791 B2
(45) Date of Patent: Jan. 28, 2020

(54) CONTROL APPARATUS, CONTROL METHOD, AND STORAGE MEDIUM

(71) Applicant: CANON KABUSHIKI KAISHA, Tokyo (JP)

(72) Inventor: Takenori Ohno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 15/233,108

(22) Filed: Aug. 10, 2016

(65) Prior Publication Data

US 2017/0064210 A1   Mar. 2, 2017

(30) Foreign Application Priority Data

Sep. 1, 2015 (JP) .................................. 2015-172117

(51) Int. Cl.
*H04N 5/232* (2006.01)
*H04N 5/247* (2006.01)

(52) U.S. Cl.
CPC ..... *H04N 5/23296* (2013.01); *H04N 5/23238* (2013.01); *H04N 5/247* (2013.01)

(58) Field of Classification Search
CPC .................. H04N 5/23296; H04N 5/23238
See application file for complete search history.

(56) References Cited

U.S. PATENT DOCUMENTS

2003/0210329 A1* 11/2003 Aagaard ................ H04N 7/181
348/159
2009/0128643 A1* 5/2009 Kondo ................. H04N 5/3415
348/218.1
2011/0149093 A1* 6/2011 Kang ..................... H04N 5/247
348/207.11
2011/0242369 A1* 10/2011 Misawa ............... H04N 5/2258
348/240.2
2011/0310219 A1* 12/2011 Kim .................. G08B 13/19643
348/36
2012/0002096 A1* 1/2012 Choi .................... H04N 5/2253
348/335

(Continued)

FOREIGN PATENT DOCUMENTS

| JP | 2006222617 A | | 8/2006 |
| JP | 2010-213249 A | | 9/2010 |
| JP | 2010213249 A | * | 9/2010 |

OTHER PUBLICATIONS

Japanese Office Action for Application No. 2015-172117 dated May 28, 2019 with English translation.

*Primary Examiner* — Rowina J Cattungal
(74) *Attorney, Agent, or Firm* — Carter, DeLuca & Farrell LLP

(57) ABSTRACT

A control apparatus of the present embodiment controls the view angles of a plurality of cameras directed from a center position toward different directions. The control apparatus includes: a changing unit configured to change a view angle corresponding to at least one camera out of the plurality of cameras to a first view angle; a deriving unit configured to derive a second view angle corresponding to another camera different from the at least one camera out of the plurality of cameras by using the first view angle; and an imaging controlling unit configured to cause the plurality of cameras to perform imaging by using the first view angle and the second view angle.

10 Claims, 18 Drawing Sheets

(56) References Cited

U.S. PATENT DOCUMENTS

2015/0092023 A1* 4/2015 Asakura ............... G03B 35/08
 348/49
2016/0344999 A1* 11/2016 Lajeunesse ......... H04N 5/23238

* cited by examiner

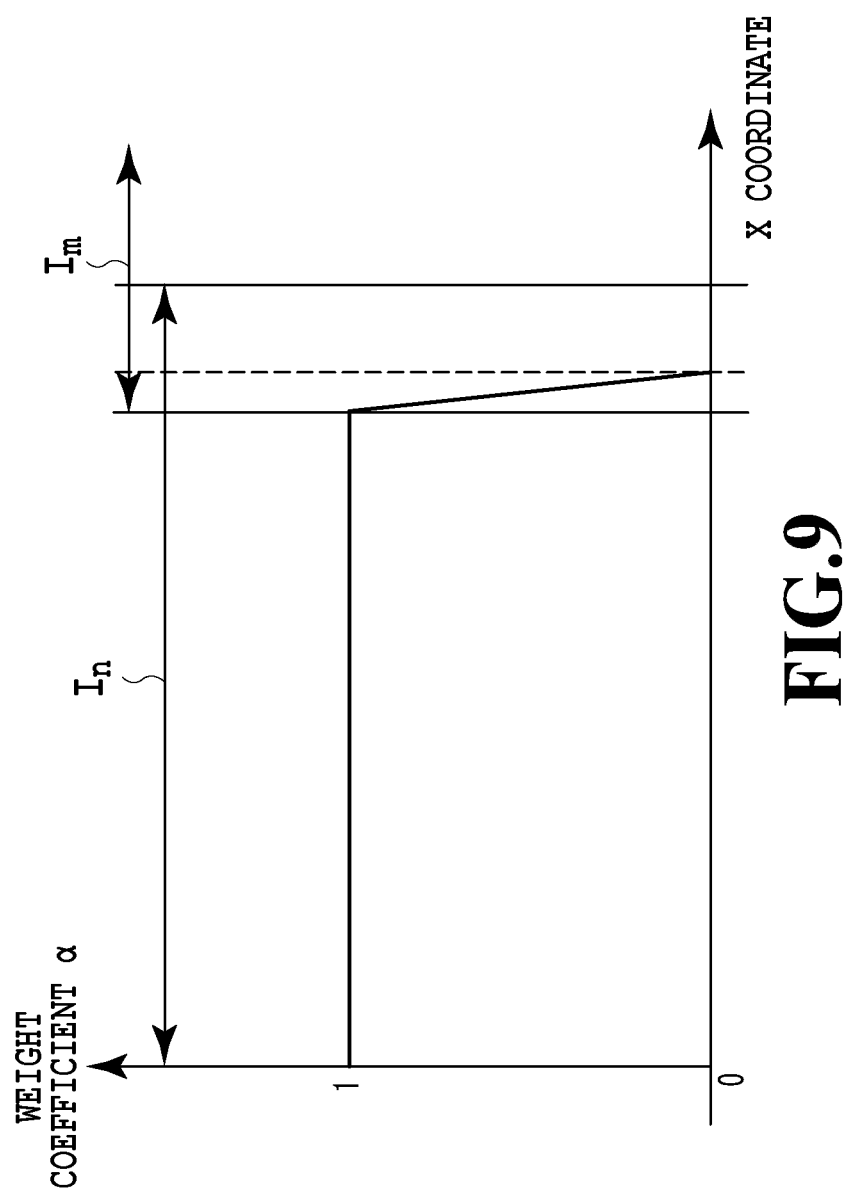

CONTROL APPARATUS, CONTROL METHOD, AND STORAGE MEDIUM

BACKGROUND OF THE INVENTION

Field of the Invention

The present invention relates to a control apparatus and a control method for controlling the view angles of a plurality of cameras in an omnidirectional camera, and a storage medium storing a program for causing a computer to function as the control apparatus and the control method.

Description of the Related Art

In the conventional art, there is known a technique of combining images taken by a plurality of cameras. Further, as a technique of imaging, part of an object included in a wide-view-angle image with high definition, there is also known a technique of performing imaging at a wide view angle by a plurality of cameras and at the same time imaging, part of an object included in a wide-view-angle image with high definition by a camera different from the plurality of cameras (Japanese Patent Laid-Open No. 2010-213249).

SUMMARY OF THE INVENTION

However, in an imaging apparatus disclosed in Japanese Patent Laid-Open No. 2010-213249, the plurality of cameras for taking a wide-view-angle image and the camera for imaging part of an object with high definition are separately provided, and accordingly, it is impossible to obtain a wide-view-angle image which includes part of an object imaged with high definition. Further, in a case where an attempt is made to image an object with optical zoom and high definition by some of the plurality of cameras for taking a wide-view-angle image, the view angles of some of the plurality of cameras becomes small, and there is a case where an area which cannot be imaged is generated.

In an aspect of the present invention, there is provided a control apparatus for controlling view angles of a plurality of cameras directed from a center position toward different directions, the control apparatus comprising: a changing unit configured to change a view angle corresponding to at least one camera out of the plurality of cameras to a first view angle; a deriving unit configured to derive a second view angle corresponding to another camera different from the at least one camera out of the plurality of cameras by using the first view angle; and an imaging controlling unit configured to cause the plurality of cameras to perform imaging by using the first view angle and the second view angle.

Further features of the present invention will become apparent from the following description of exemplary embodiments (with reference to the attached drawings).

BRIEF DESCRIPTION OF THE DRAWINGS

FIG. 9 is a schematic diagram showing an example of a change in weight coefficient a according to the first embodiment;

DESCRIPTION OF THE EMBODIMENTS

Figure 1:
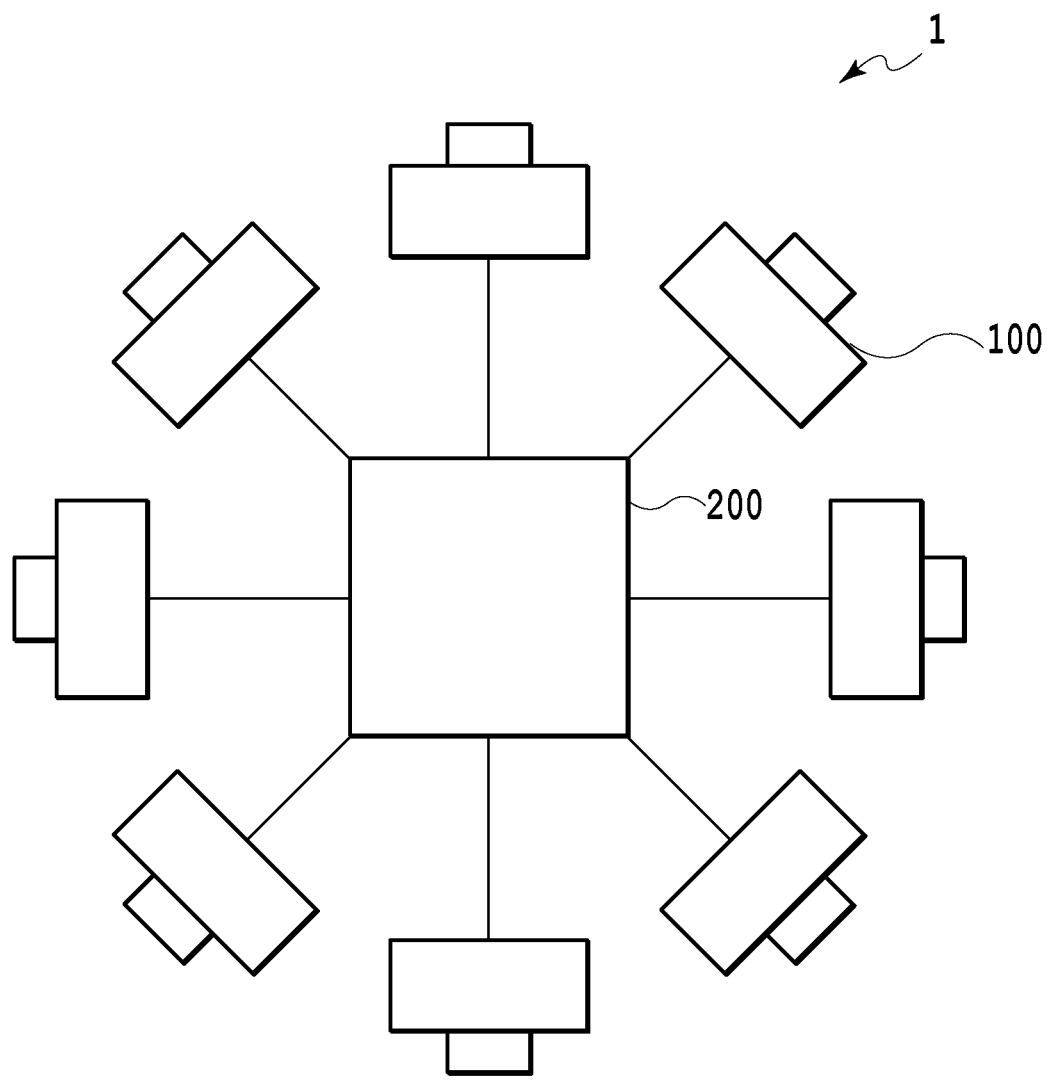
FIG. 1 is a schematic diagram showing the configuration of an omnidirectional camera according to a first embodiment.

Hereinafter, embodiments of the present invention will be described with reference to the drawings. The following embodiments do not limit the present invention, and not all combinations of features explained in the embodiments are essential to solving means of the present invention. Incidentally, the same reference numeral will be used for the same element for the following explanation.

[First Embodiment]

FIG. 1 is a schematic diagram showing the configuration of an omnidirectional camera 1 according to the present embodiment. The omnidirectional camera 1 of the present embodiment includes a plurality of cameras 100 and a PC 200. The plurality of cameras 100 are directed from a center position toward different directions. Explanation will be made below on processing cooperatively performed by the plurality of cameras 100 and the PC 200. In the omnidirectional camera 1 of the present embodiment, the plurality of cameras 100 constituting the omnidirectional camera 1 perform imaging in synchronization with one another, and the PC 200 performs image processing on a taken image, thereby generating one wide-view-angle image. Out of the plurality of cameras 100, a camera for imaging an object of interest is referred to as a main camera, and a camera other than the main camera is referred to as a slave camera. Further, a spherical wide-view-angle image can also be generated by extending the plurality of cameras 100 not only in a horizontal direction, but also in a vertical direction, but in the present embodiment, its explanation will be omitted for simplification. A panoramic image spanning 360 degrees in the horizontal direction is referred to as a wide-view-angle image.

Figure 2A:
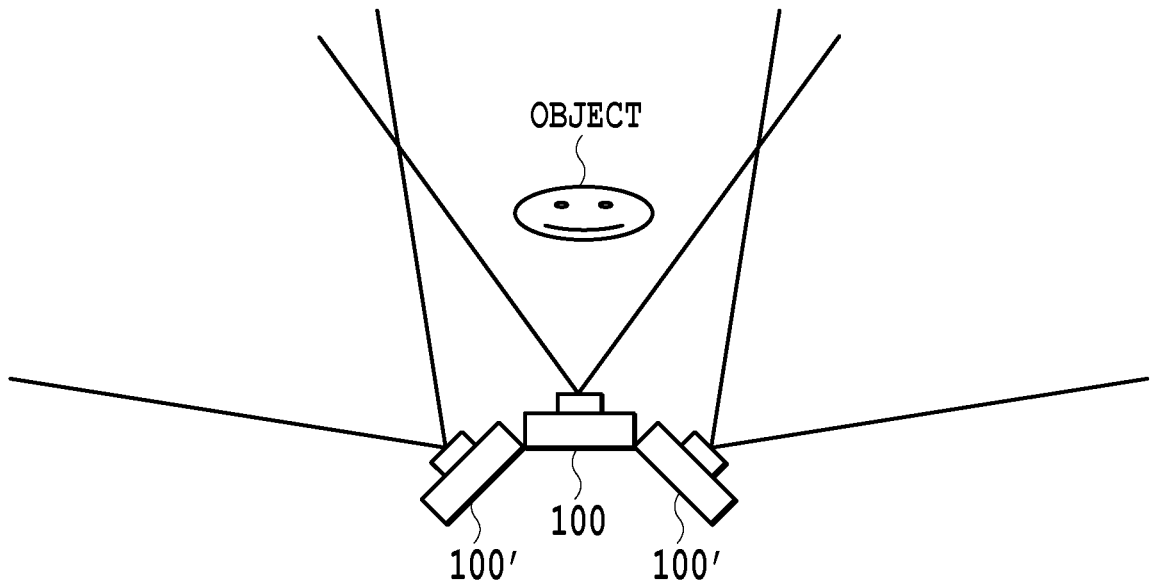
FIG. 2A is a schematic diagram showing adjustment of the view angles of an omnidirectional camera of the conventional art.
Figure 2B:
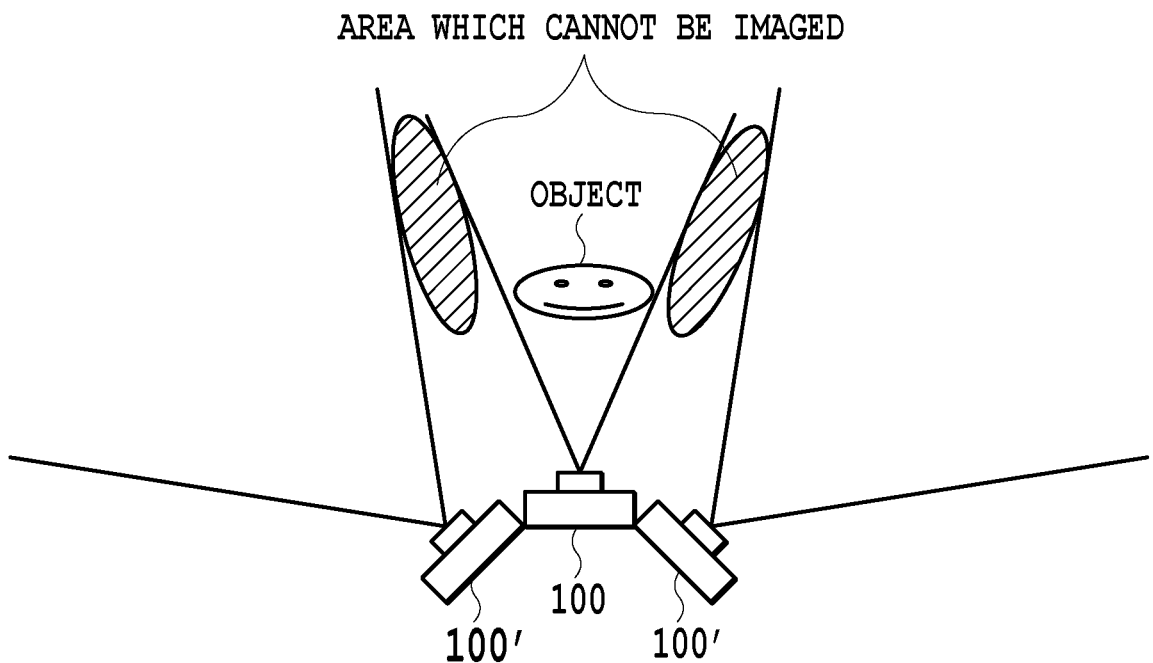
FIG. 2B is a schematic diagram showing adjustment of the view angles of the omnidirectional camera of the conventional art.

FIGS. 2A and 2B are schematic diagrams showing adjustment of the view angles of an omnidirectional camera of the conventional art. Discussion will be made on control of a view angle necessary for obtaining a wide-view-angle image including part of an object which is imaged with high definition with reference to FIGS. 2A and 2B. FIG. 2B is a schematic diagram showing an example in which one of the cameras 100 constituting the omnidirectional camera performs optical zoom, thereby reducing the view angle of the camera 100. The camera 100 shifts from a state in which the camera 100 images an object at a normal magnification (FIG. 2A) to a state in which the camera 100 images the object with optical zoom and high definition (FIG. 2B). On this occasion, since the view angle of the camera 100 becomes small, there is generated an area which cannot be imaged by the camera 100 or a camera 100' adjacent to the camera 100. In this manner, in a case where an attempt is made to image the object with high definition, the view angle of the camera imaging the object becomes small, and there is a case where it is impossible to generate a wide-view-angle image from the images taken with the plurality of cameras.

<Inner Configurations of the Camera 100 and the PC 200>

Figure 3:
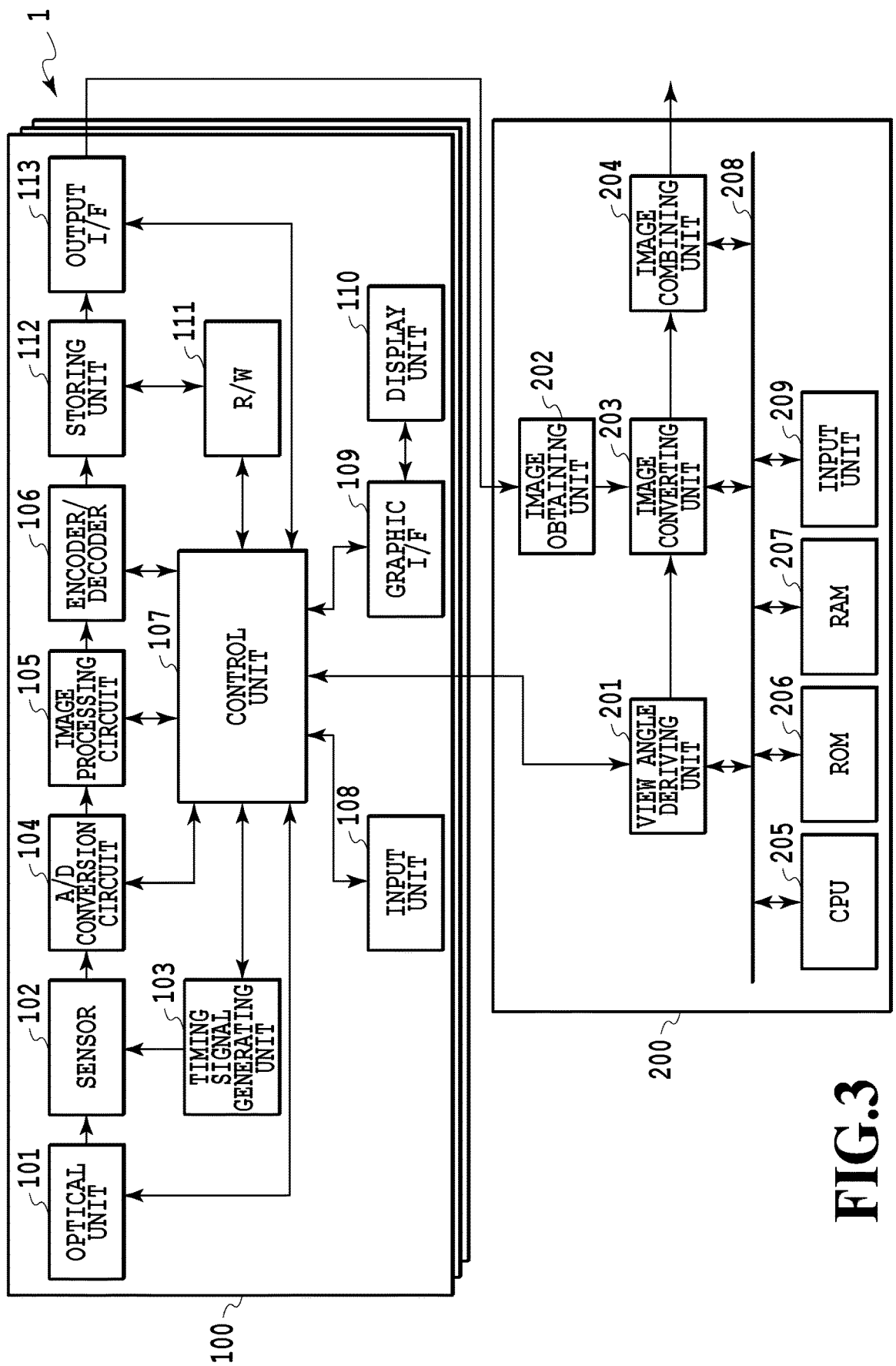
FIG. 3 is a block diagram showing the inner configurations of the camera and a PC according to the first embodiment.

FIG. 3 is a block diagram showing the inner configurations of the camera 100 and the PC 200 according to the present embodiment. First, the inner configuration of the camera 100 will be described with reference to FIG. 3. As shown in FIG. 1, the omnidirectional camera of the present embodiment includes the plurality of cameras, and each camera 100 has the same configuration unless explained otherwise.

An optical unit 101 includes a lens for collecting light from an object into a sensor 102, a driving device for moving a lens to adjust a focus or perform zooming, a shutter mechanism, an iris mechanism, and the like. Each mechanism constituting the optical unit 101 is driven based on a control signal from a control unit 107. The sensor 102 is driven in response to a timing signal output from a timing signal generating unit 103, and converts incident light from the object into an electric signal. The timing signal generating unit 103 outputs a timing signal under the control of the control unit 107. An A/D conversion circuit 104 performs A/D conversion of an electric signal output from the sensor 102 and outputs a digital image signal. An image processing circuit 105 processes the image signal output from the A/D conversion circuit 104 by performing all or part of camera signal processing such as demosaic processing, white balance processing, color correction processing, AF processing, and AE processing. An encoder/decoder 106 compresses and encodes an image signal output from the image processing circuit 105 by using a still image/moving image data format of the JPEG standard or the like. Further, the encoder/decoder 106 expands and decodes encoded still image/moving image data supplied from the control unit 107.

The control unit 107 is a microcontroller including, for example, a CPU, a ROM, and a RAM and integrally controls each unit of the camera 100 by executing a program stored in the ROM. An input unit 108 is constituted by various operation interfaces such as a shutter release button, and outputs, to the control unit 107, a control signal based on an input operation by a user. A graphic I/F 109 generates an image signal for displaying a display unit 110 from an image signal supplied from the control unit 107, and supplies the generated image signal to the display unit 110. The display unit 110 is, for example, a liquid crystal display and converts the image signal supplied from the graphic I/F 109 into an image and displays the image. The display unit 110 displays, for example, a camera-through image before imaging and an image stored in a memory card or the like. An R/W 111 is removably connected to a memory card including a portable flash memory as a print medium for storing image data or the like generated by performing imaging by the camera 100. The R/W 111 writes, to the memory card, data supplied from the control unit 107 and data read from a storing unit 112, and outputs data read from the memory card to the control unit 107. Incidentally, as a print medium other than the memory card, it is possible to use a writable optical disk, an HDD, or the like. An output I/F 113 is a connection terminal such as a USB, an HDMI (registered trademark), or an HD-SDI, and image data stored in the memory card is transmitted to an external device such as a PC.

Next, the inner configuration of the PC will be described with reference to FIG. 3. As shown in FIG. 1, the PC 200 of the present embodiment is connected to the plurality of cameras 100 so that the PC 200 can communicate with the cameras 100. This PC 200 constitutes a control apparatus for controlling the plurality of cameras 100 connected to the PC 200 so that the cameras 100 can communicate with the PC 200.

In response to changing the view angle of at least one camera 100 out of the plurality of cameras 100, a view angle deriving unit 201 performs processing for deriving the view angle of another camera 100. A specific processing method will be described later. An image obtaining unit 202 obtains images taken by the plurality of cameras 100, and temporarily stores the images in a storage area such as a RAM 207. An image converting unit 203 performs processing for converting the taken images based on view angles corresponding to the plurality of cameras 100 and supplied from the view angle deriving unit 201 and the taken images stored by the image obtaining unit 202. A specific processing method will be described later. An image combining unit 204 combines the taken images after converting processing supplied from the image converting unit 203, and generates a wide-view-angle image. A specific processing method for generating the wide-view-angle image will be described later.

A CPU 205 integrally controls the following units. A ROM 206 is an area for storing a control program to be executed by the CPU 205, a table, or the like. The RAM 207 functions as a main memory and a work area of the CPU 205. A bus 208 is a data transfer path for various data, and for example, the image data processed by the image combining unit 204 is transmitted to a predetermined display unit externally connected to the PC 200 via the bus 208. An input unit 209 includes a shutter release button, a button for receiving input of various operation instructions, a touch panel, and the like, and the user can operate a button or the like of the input unit 209, thereby giving an operation instruction to the cameras 100 from the PC 200.

<Basic Operation of Imaging by the Omnidirectional Camera 1>

Explanation will be made on a basic operation of performing imaging by the above-described omnidirectional camera 1. The omnidirectional camera 1 receives adjustment of the view angle of the optical unit 101 of the camera 100 via the input unit 209 of the PC 200. This enables the user to change the view angle of the optical unit 101 before imaging so that an object can be imaged with higher definition. Incidentally, adjustment of the optical unit 101 of the camera 100 can be received via the input unit 108 of the camera 100.

Next, the omnidirectional camera 1 receives designation of a main camera out of the plurality of cameras via the input unit 209 of the PC 200. The user half-depresses the shutter release button of the input unit 209 of the PC 200 in a state in which designation of the main camera is received. The control unit 107 of each camera transmits the view angle of the current main camera to the PC 200 in response to half-depression of the shutter release button of the input unit 209 of the PC 200.

Next, the control unit 107 of each camera receives a view angle derived from the PC 200, and controls the optical unit 101 so that the view angle of the optical unit 101 becomes the view angle received from the PC 200. Explanation will be made later on a specific processing method for controlling a view angle by the control unit 107 of each camera. After the control unit 107 of each camera performs control to change the view angle of the optical unit 101, the control unit 107 of each camera transmits a taken image to the PC 200 in response to the user depressing the shutter release button.

<Method for Deriving a View Angle>

Figure 4:
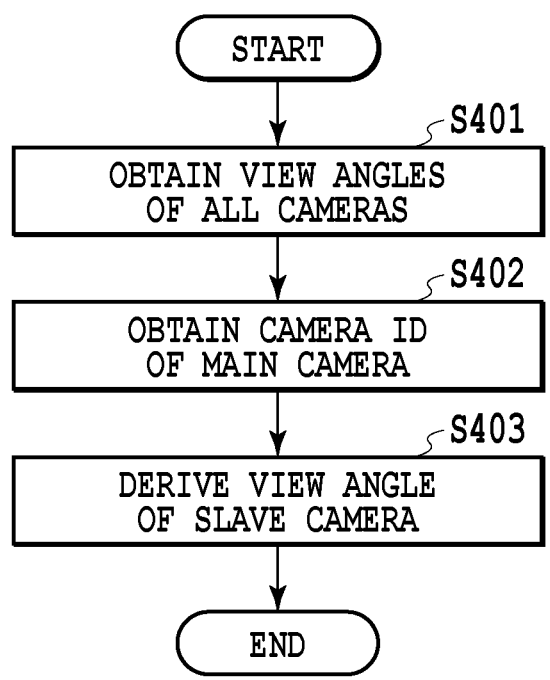
FIG. 4 is a flowchart showing processing for deriving a view angle according to the first embodiment.

FIG. 4 is a flowchart showing processing for deriving the view angle of a slave camera according to the present embodiment. With reference to the flowchart shown in FIG. 4, explanation will be made on processing in which the PC 200 derives the view angle of the slave camera in order to image an object with high definition and generate a wide-view-angle image. Incidentally, in the processing according to the flowchart shown in FIG. 4, program code stored in the ROM 206 is loaded in the RAM 207, and executed by the CPU 205.

In S401, the view angle deriving unit 201 obtains, from all the cameras constituting the plurality of cameras 100, a camera ID which is the ID of each camera and a view angle which corresponds to each camera in a form in which the camera ID and the view angle correspond to each other.

In S402, the view angle deriving unit 201 obtains the camera ID of the main camera for capturing the object of interest. More specifically, the view angle deriving unit 201 obtains, as the camera ID of the main camera, the camera ID of a camera whose designation is received from the user via the input unit 209 of the PC 200.

In S403, the view angle deriving unit 201 derives the view angle of the slave camera. In the present embodiment, the view angle deriving unit 201 sets the view angle corresponding to the camera ID of the slave camera to a maximum view angle which can be set in the camera 100. The view angle deriving unit 201 outputs a corresponding view angle to the camera 100 specified by the camera ID of the slave camera. In this manner, it can be said that the view angle deriving unit 201 for outputting a corresponding view angle to the camera 100 specified by the camera ID of the slave camera is an imaging controlling unit configured to cause the camera 100 to perform imaging at the corresponding view angle. Incidentally, in the present embodiment, explanation has been made on an example in which designation of the main camera is received from the user (S402), but the present invention is not limited to this example. For example, it is possible to use an example in which the main camera is designated by automatically determining a camera whose view angle is the smallest among the view angles of the cameras obtained in S401 to be the main camera.

<Processing for Controlling the View Angle of the Camera 100>

In a case where the control unit 107 of the camera 100 receives a view angle corresponding to a camera ID from the PC 200, the control unit 107 controls the optical unit 101 so that the view angle of the optical unit 101 is equal to the received view angle.

<Processing for Converting a Taken Image>

Figure 5:
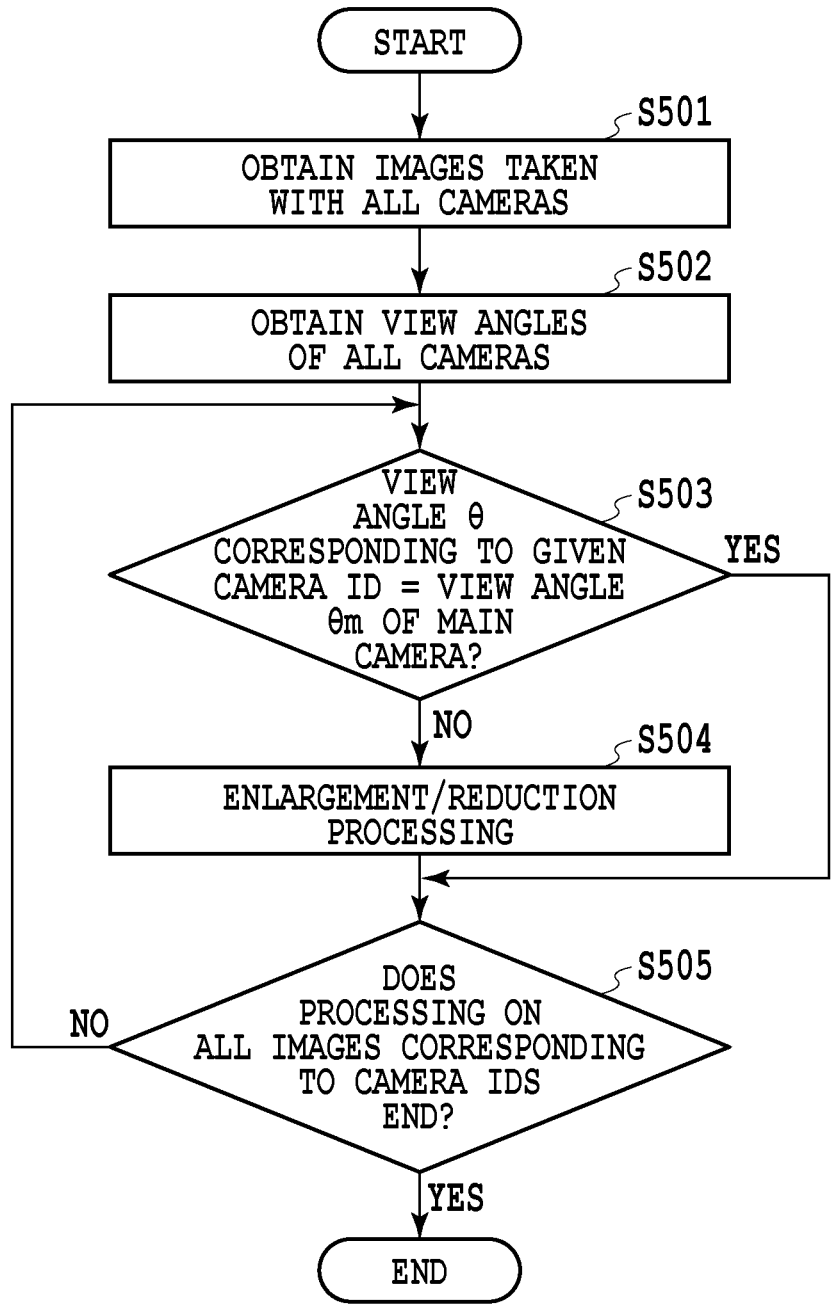
FIG. 5 is a flowchart showing processing for converting an image according to the first embodiment.

FIG. 5 is a flowchart showing processing for converting images taken by cameras having different view angles out of the plurality of cameras 100 according to the present embodiment. With reference to the flowchart shown in FIG. 5, explanation will be made on processing for converting images taken by cameras having different view angles. Incidentally, in the processing according to the flowchart shown in FIG. 5, the program code stored in the ROM 206 is loaded in the RAM 207, and executed by the CPU 205.

In S501, the image obtaining unit 202 obtains, from all the cameras constituting the omnidirectional camera 1, each camera ID and an image taken by a camera corresponding to the camera ID.

In S502, the image converting unit 203 obtains, from the view angle deriving unit 201, each camera ID and a view angle specified by the camera ID.

In S503, the image converting unit 203 compares the view angle θ of a camera corresponding to a given camera ID with the view angle θm of the main camera, and makes determination. In a case where the view angle θ is equal to the view angle θm of the main camera (S503: YES), the process proceeds to S505. On the other hand, in a case where the view angle θ is not equal to the view angle θm of the main camera (S503: NO), the process proceeds to S504.

In step S504, the image converting unit 203 converts a taken image corresponding to the camera ID. In the present embodiment, the image converting unit 203 enlarges or reduces the taken image corresponding to the camera ID. An enlargement/reduction rate S for enlargement/reduction processing can be calculated according to the following formula.

$$S = \frac{\theta}{\theta_m} \quad \text{Formula (1)}$$

Incidentally, a method for enlarging or reducing a taken image may be a publicly-known method such as a linear interpolation method or a nearest neighbor method.

In S505, the image converting unit 203 determines whether view angles corresponding to all the camera IDs are compared with the view angle θm of the main camera. In a case where there is an unprocessed camera ID (S505: NO), the process proceeds to S503 in order to compare a view angle corresponding to a next camera ID with the view angle θm of the main camera and makes determination. In a case where processing for comparing the view angles corresponding to all the camera IDs and making determination ends (S505: YES), processing according to the flowchart shown in FIG. 5 ends.

<Processing for Combining Images>

Figure 6:
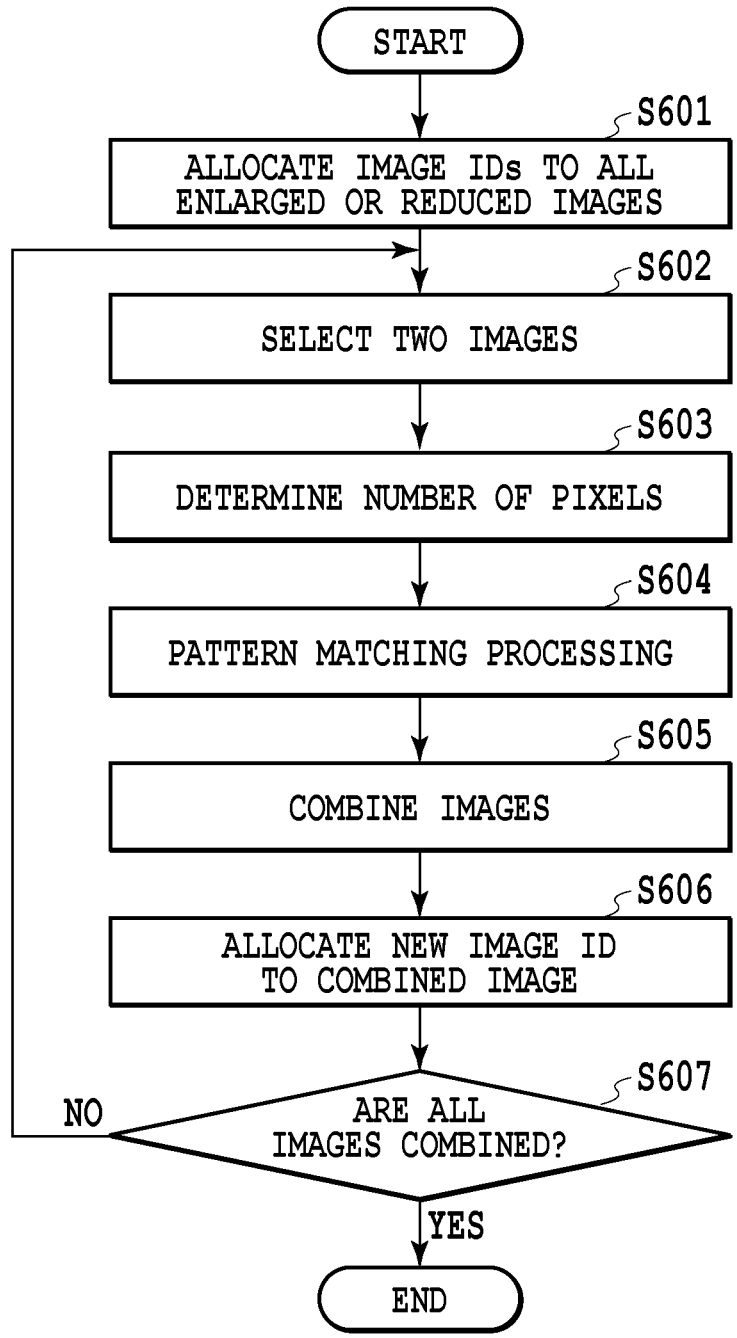
FIG. 6 is a flowchart showing processing for combining images according to the first embodiment.

FIG. 6 is a flowchart showing processing for combining a plurality of images which are subjected to the enlargement/reduction processing in S504 according to the present embodiment. With reference to the flowchart shown in FIG.

6, explanation will be made on processing for combining a plurality of images which are subjected to the conversion processing in S504. Incidentally, in the processing according to the flowchart shown in FIG. 6, the program code stored in the ROM 206 is loaded in the RAM 207, and executed by the CPU 205.

In S601, the image combining unit 204 allocates unique image IDs to all images which are subjected to enlargement/reduction processing by the image converting unit 203. For example, in a case where there are N images, identifiable image IDs I1, I2, I3, . . . , IN are allocated to the images.

In S602, the image combining unit 204 selects two images from a group of images to which the image IDs are allocated in S601. Examples of two images selected in S602 are an image In and an image Im in FIG. 7.

Figure 7:
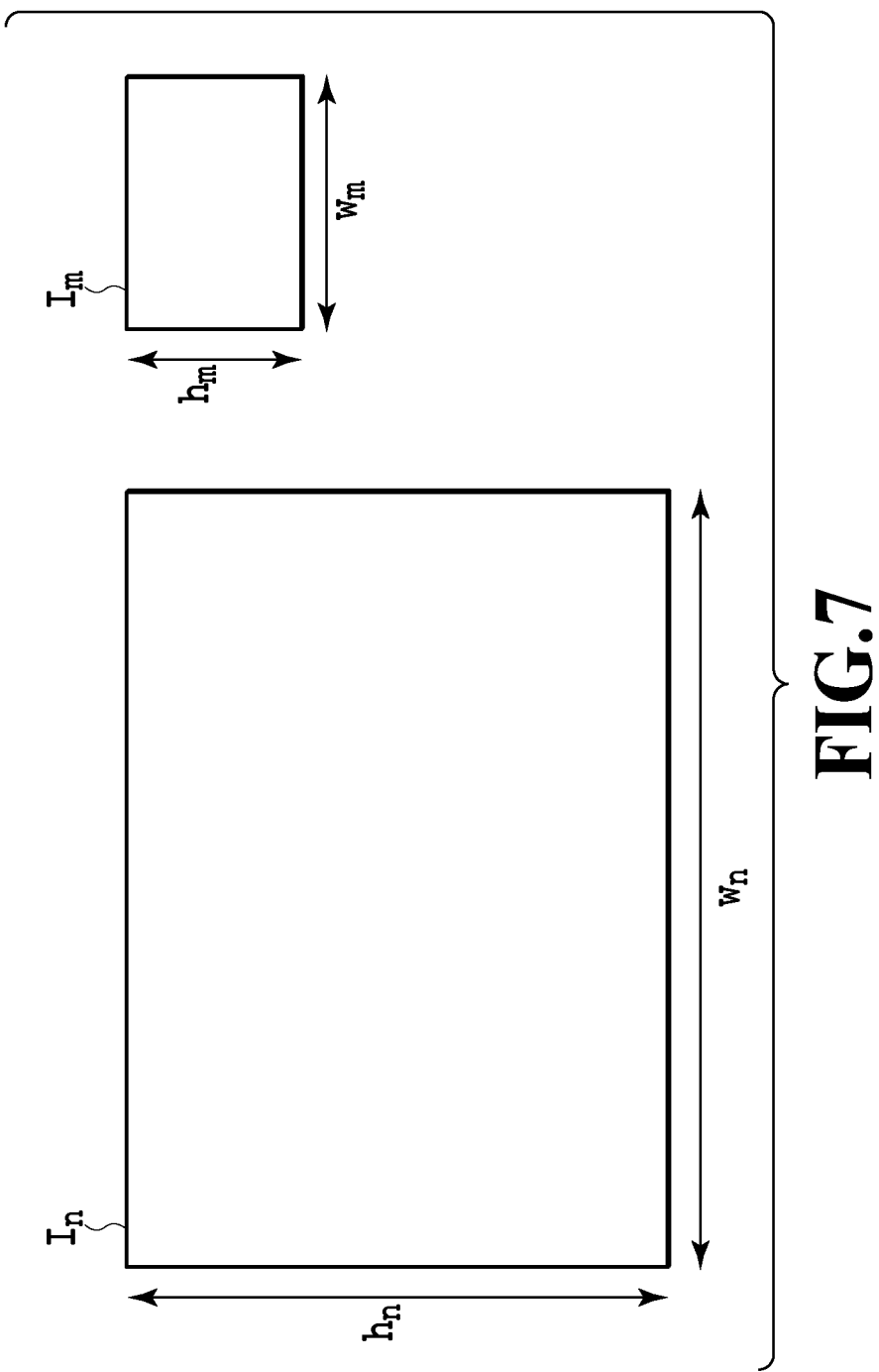
FIG. 7 is a schematic diagram showing examples of two taken images according to the first embodiment.

In S603, the image combining unit 204 determines the number of pixels in the image In selected in S602 and the number of pixels in the image Im selected in S602. In the present embodiment, explanation will be made assuming that the number of pixels in the image In is larger than the number of pixels in the image Im as shown in FIG. 7.

In S604, the image combining unit 204 performs pattern matching between the image In and the image Im. It is possible to apply a publicly-known technique as this pattern matching.

$$R_{SSD}(x, y) = \sum_{v=1}^{h_m} \sum_{u=1}^{w_m} (I_n(x + u - 1, y + v - 1) - I_m(u, v))^2 \quad \text{Formula (2)}$$

For example, as expressed by the above mathematical formula, similarity $R_{SSD}$ (x, y) between images at coordinates (x, y) is calculated. Here, u and v represent coordinates in the image Im, and hn and wn represent the number of vertical pixels and the number of horizontal pixels in the image In, respectively. Likewise, hm and wm represent the number of vertical pixels and the number of horizontal pixels in the image Im, respectively. The image combining unit 204 changes the coordinates (x, y) in the image In, searches the entire image In for an area similar to the image Im, and calculates a minimum value as the similarity $R_{SSD}$. Further, as a result of search, the image combining unit 204 stores, in the RAM 207, coordinates corresponding to the minimum value as (xp, yp).

Figure 8:
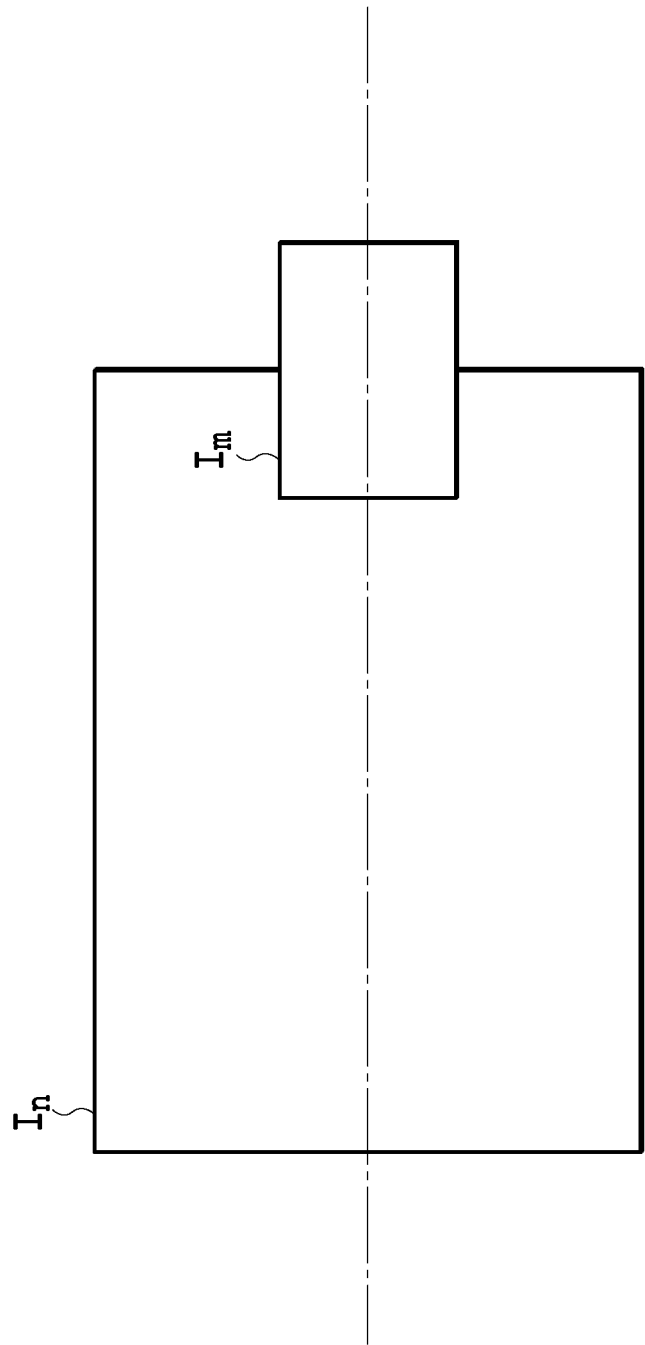
FIG. 8 is a schematic diagram showing an example of a combined image in which two images are combined according to the first embodiment.

In S605, the image combining unit 204 combines the image In and the image Im so that matching areas in the images In and Im overlap each other. FIG. 8 shows an example of a combined image in which the image In and the image Im are combined in S605. In the present embodiment, the image combining unit 204 can perform combining processing in S605 by using the following formula in the case of matching the image In and the image Im in FIG. 8, for example.

$$I'(x, y) = \alpha I_n(x, y) + (1-\alpha) I_m(x, y) \quad \text{Formula (3)}$$

I' represents an image after the image In and the image Im are combined, and α represents a weight coefficient in the range of 0 to 1. FIG. 9 shows a change in weight coefficient α on a dotted line in FIG. 8.

As described above, the image Im has higher definition than the image In. As shown in FIG. 9, the weight coefficient α changes so that the combined image I' is a high-definition image in the area of the image Im. More specifically, the weight coefficient α changes so that the weight coefficient α is 1 in the image In, gradually decreases in a predetermined area in which the image In and the image Im overlap each other, and is 0 in the image Im.

In S606, the image combining unit 204 allocates a new image ID to the combined image I' generated in S605. For example, in a case where a maximum image ID is N, an image ID such as IN+1 is allocated to the combined image I'.

In S607, the image combining unit 204 determines whether all images are combined to generate one combined image. In a case where one combined image is generated (S607: YES), the image combining unit 204 outputs the combined image generated in S605 to a display unit or the like, and the processing according to the flowchart shown in FIG. 6 ends. In a case where one combined image is not generated (S607: NO), the process proceeds to S602 again, and image IDs other than the two image IDs selected in S602 before are selected, and processing in S603 onward is performed again.

Figure 10A:
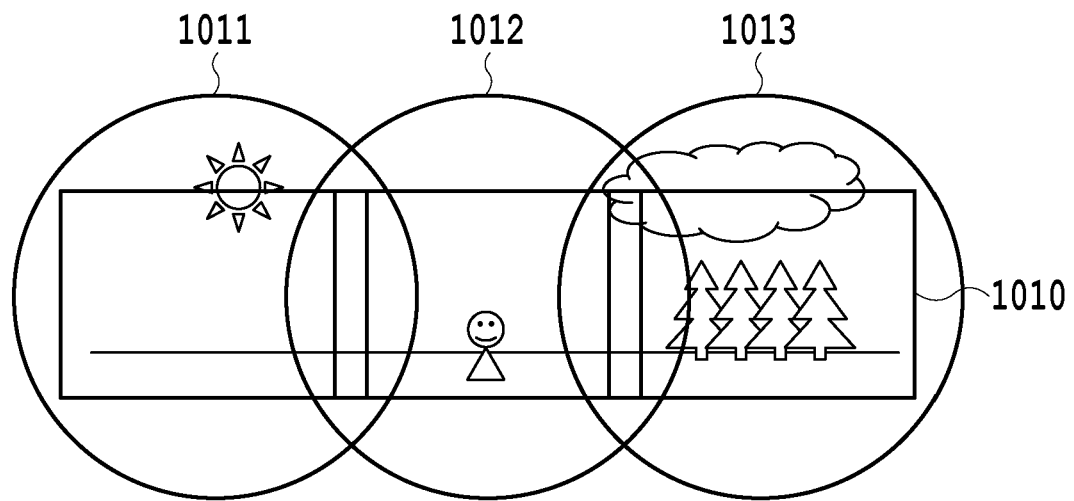
FIG. 10A is a diagram showing a specific example of a combined image generated in a case where the view angles of all cameras constituting the omnidirectional camera of the first embodiment are equal.

FIG. 10A is a diagram showing a specific example of a combined image generated in a case where the view angles of all the cameras constituting the omnidirectional camera 1 of the present embodiment are equal. FIG. 10A shows a combined image 1010 generated from three taken images. A view angle 1012 indicates the view angle of the main camera, and view angles 1011 and 1013 indicate the view angles of the slave cameras. In a case where the view angles of all the cameras are equal, all the taken images are each composed of an equal number of pixels. In the present embodiment, three images each having an equal number of pixels are combined to generate the combined image 1010.

Figure 10B:
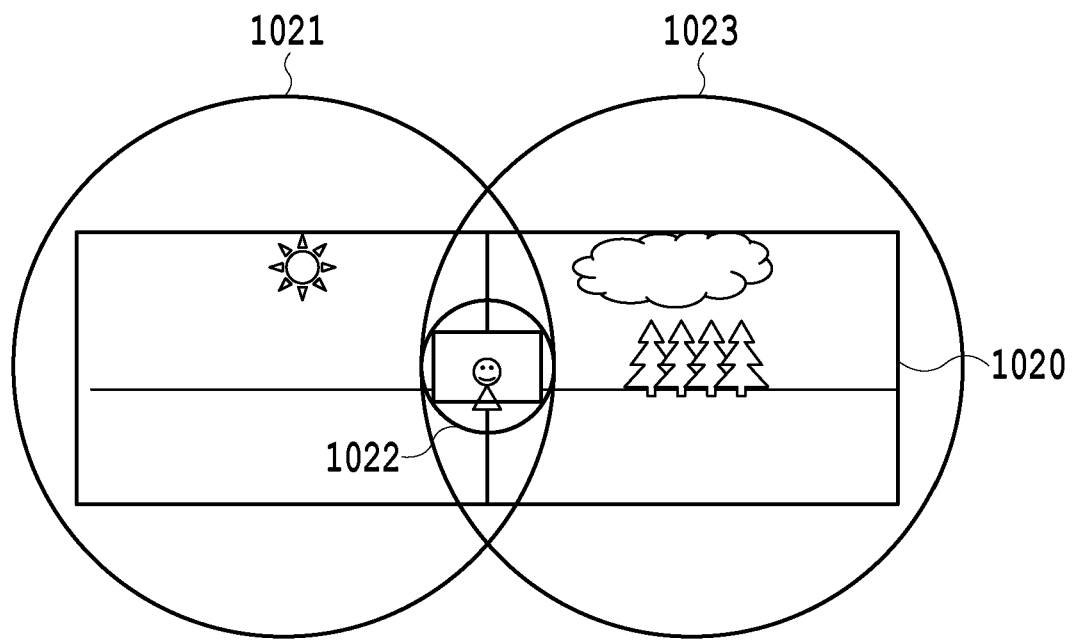
FIG. 10B is a diagram showing a specific example of a combined image generated in a case where a main camera of the first embodiment images an object with high definition.

FIG. 10B is a diagram showing a specific example of a combined image generated in a case where the main camera zooms in on an object and images the object with high definition according to the present embodiment. FIG. 10B shows a combined image 1020 generated from three taken images. A view angle 1022 indicates the view angle of the main camera, and view angles 1021 and 1023 indicate the view angles of the slave cameras. As described above, in a case where out of the plurality of cameras 100 constituting the omnidirectional camera 1, a given camera zooms in on an object, the view angle of the main camera for imaging the object of interest becomes small, and the view angles of the slave cameras are maximized. Then, a predetermined enlargement rate is applied to images taken by the slave cameras (S504). As a result, one taken image having a high resolution and a small number of pixels and two taken images having a low resolution and a large number of pixels are combined to generate the combined image 1020 shown in FIG. 10B.

Further, in the present embodiment, combining processing is performed to enhance the definition of an area of an image taken with high definition, but it is possible to simply generate a combined image based on an average of the pixel values of two images. Furthermore, as described above, in the present embodiment, a panoramic image spanning 360 degrees in the horizontal direction is a wide-view-angle image, but it is also possible to generate a spherical wide-view-angle image by extending image processing shown in FIGS. 4 to 6 not only in the horizontal direction, but also in the vertical direction.

As explained above, the omnidirectional camera 1 of the present embodiment can suppress generation of an area which cannot be imaged and obtain a wide-view-angle image including part of an object taken with high definition by controlling the view angles of the plurality of cameras.

[Second Embodiment]

In the first embodiment, explanation has been made on the example in which in a case where the main camera zooms in on an object, control is performed so that the view angles of the slave cameras are maximized. However, there is a case where the view angles of the slave cameras are excessively large, and in a generated wide-view-angle image, there arises a large difference in definition between a portion imaged by the main camera and a portion imaged by a peripheral camera. Accordingly, in the present embodiment, explanation will be made on a method for generating a high-definition image as an entire wide-view-angle image while imaging an object with high definition by controlling the view angle of the slave camera according to a distance between the main camera and the object. Incidentally, explanation of portions common to the first and second embodiments will be simplified or omitted, and explanation will be mainly made below on points unique to the present embodiment.

<Inner Configurations of the Camera 100 and the PC 200>

Figure 11:
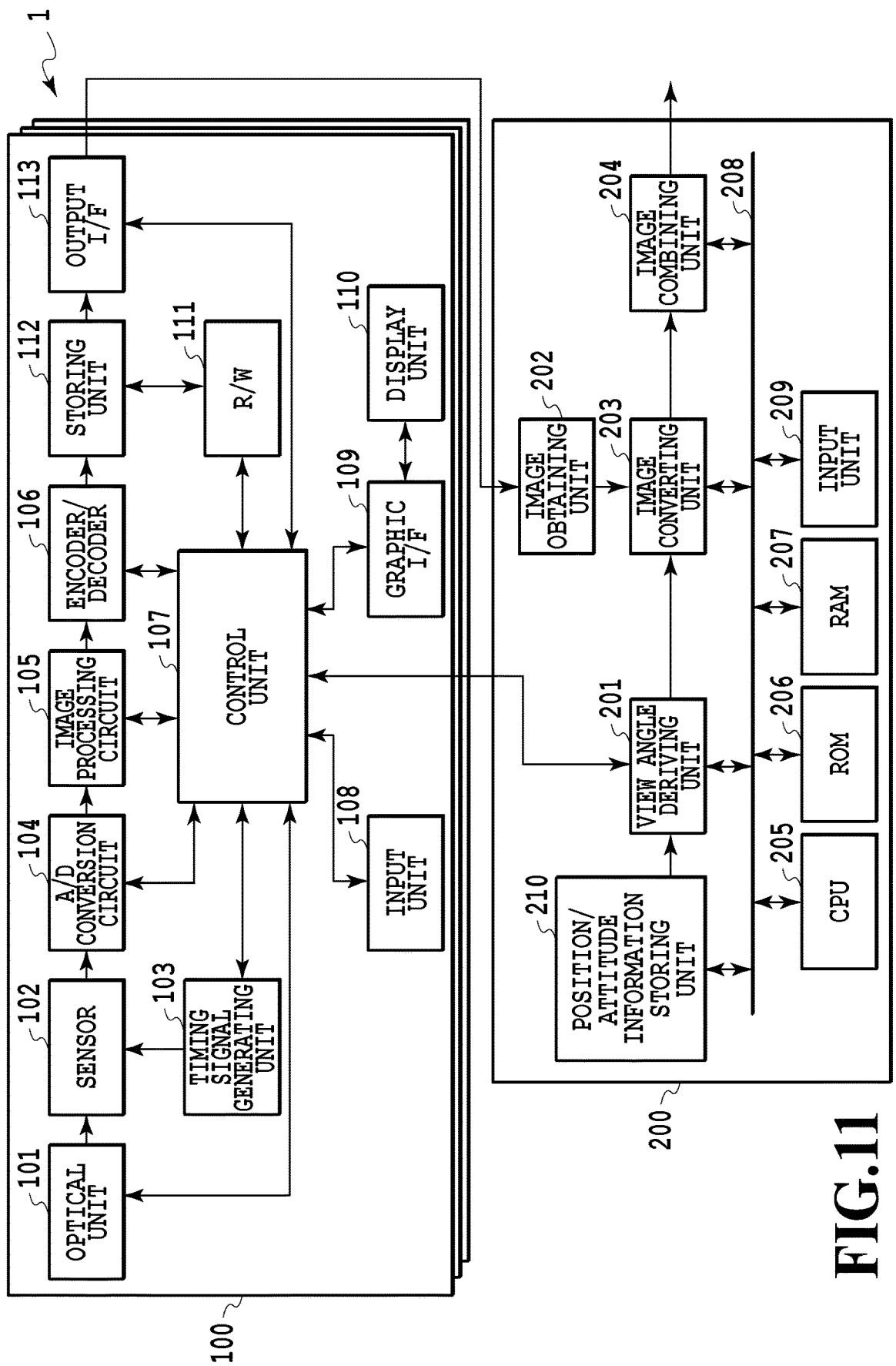
FIG. 11 is a block diagram showing the inner configurations of a camera and a PC according to a second embodiment.

FIG. 11 is a block diagram showing the inner configurations of the camera 100 and the PC 200 according to the present embodiment. The elements ranging from the optical unit 101 to the input unit 209 are common to the first and second embodiments, and their explanation will be omitted.

A position/attitude information storing unit 210 holds position/attitude information specifying at what position and in what attitude the plurality of cameras 100 constituting the omnidirectional camera 1 are disposed in the omnidirectional camera 1. In the present embodiment, the position/attitude information includes coordinate information on coordinates in xyz three-dimensional coordinate space indicating the relative positions of the cameras 100 and rotational coordinate information on rotational coordinates in xyz three-dimensional coordinate space indicating the relative orientations of the cameras 100, and can be read from the ROM 206, for example.

<Method for Deriving a View Angle>

Figure 12:
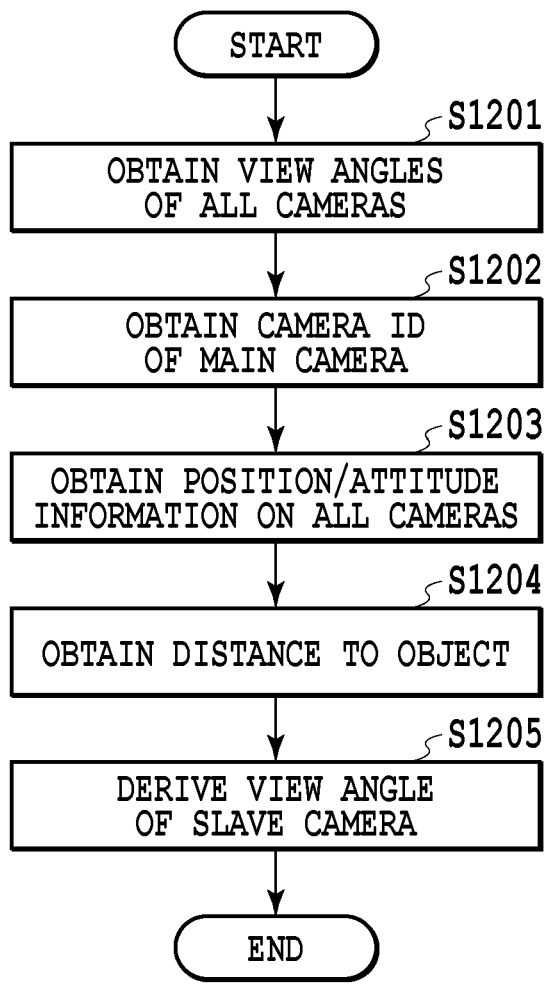
FIG. 12 is a flowchart showing processing for deriving a view angle according to the second embodiment.

FIG. 12 is a flowchart showing processing for deriving the view angle of the slave camera according to the present embodiment. With reference to the flowchart shown in FIG. 12, explanation will be made on processing for deriving the optimum view angle of the slave camera by the PC 200 in order to generate a wide-view-angle image including part of an object imaged with high definition while suppressing generation of an area which cannot be imaged. Incidentally, in the processing according to the flowchart shown in FIG. 12, the program code stored in the ROM 206 is loaded in the RAM 207, and executed by the CPU 205.

Processing in S1201 and S1202 is identical to processing in S401 and S402 in the first embodiment, and their explanation will be omitted. In S1203, the view angle deriving unit 201 obtains the position/attitude information on all the cameras from the position/attitude information storing unit 210. The position/attitude information is represented by the coordinate information indicating the relative positions of the cameras 100 in the omnidirectional camera 1 and the rotational coordinate information indicating the relative orientations of the cameras 100 as described above.

In S1204, the view angle deriving unit 201 obtains a distance between the main camera and the object. As a specific method for obtaining the distance, a publicly-known method can be used. For example, the distance can be obtained from the result of the auto focus of the main camera, or the distance to the object can be obtained by imaging the object by the plurality of cameras and using triangulation.

Figure 13:
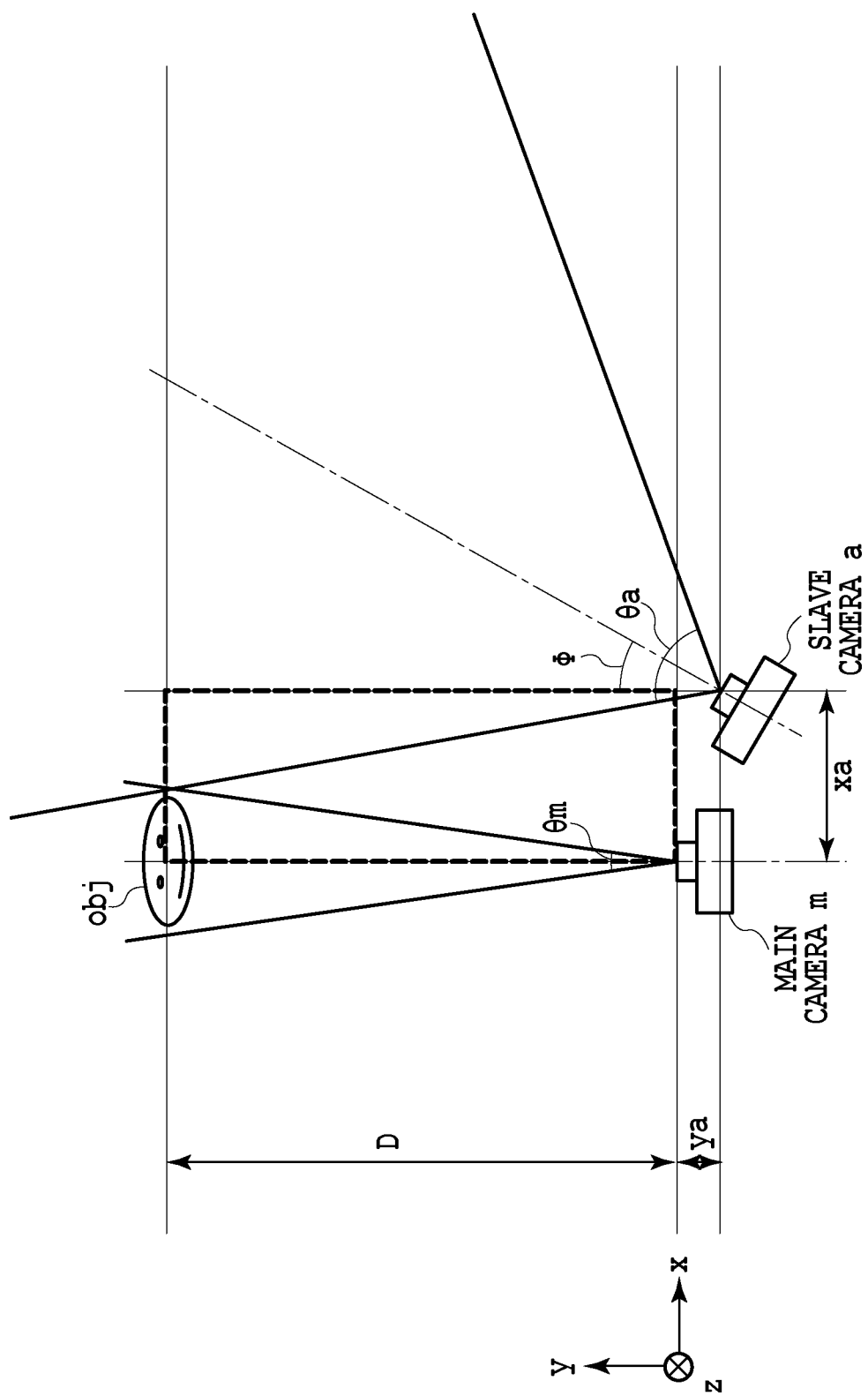
FIG. 13 is a schematic diagram showing an example of a positional relationship between an object and cameras according to the second embodiment.

In S1205, the view angle deriving unit 201 derives the view angle of the slave camera. FIG. 13 shows a positional relationship among the object, the main camera, and the slave camera in a case where the cameras are positioned on a predetermined circumference (FIG. 1). In FIG. 13, D is a distance from the main camera m to the object obj in the direction of the y-axis, $\theta_m$ is the view angle of the main camera m, and $\theta_a$ is the view angle of the slave camera a. Further, the x-axis is an axis which is perpendicular to the optical axis of the main camera m and which is horizontal to the ground contact surface of the omnidirectional camera 1 (hereinafter referred to as "the ground contact surface"), the y-axis is in the direction of the optical axis, and the z-axis is an axis which is perpendicular to the optical axis and which is perpendicular to the ground contact surface. Further, the coordinates of the main camera m in the xyz three-dimensional coordinates are (xm, ym, zm), and the coordinates of the slave camera a are (xm+xa, ym−ya, zm). The rotational coordinates of the main camera m in the xyz three-dimensional space coordinates (rotational angles around the x-axis, the y-axis, and the z-axis) are (0, 0, 0), and the rotational coordinates of the slave camera a are (0, 0, φ). The view angle $\theta_a$ of the slave camera a is derived as a value satisfying the following formula.

$$D\tan\frac{\theta_m}{2} + (D + y_a)\tan\left(\frac{\theta_a}{2} - \phi\right) - x_a > Th \therefore \quad \text{Formula (4)}$$

$$\theta_a > 2\phi + 2\tan^{-1}\left(\frac{Th + x_a - D\tan\frac{\theta_m}{2}}{D + y_a}\right)$$

Incidentally, Th is a threshold, and in the present embodiment, Th is a threshold for determining how much a given area of the object obj captured by the main camera m overlaps a given area of the object obj captured by the slave camera a. The view angle deriving unit 201 outputs the view angle derived in S1205 to the slave camera. The control unit 107 of the slave camera performs control so that the view angle of the slave camera becomes the view angle received by the optical unit 101.

As explained above, the omnidirectional camera 1 of the present embodiment can image the object with high definition and generate a high-definition image as an entire wide-view-angle image by controlling the view angle of the slave camera according to the distance to the object. Further, the view angle $\theta_a$ of the slave camera a is derived by calculating the above mathematical formula, and a mathematical formula for deriving the view angle $\theta_a$ is not limited to the above mathematical formula as long as the mathematical formula is based on the view angle $\theta_m$ of the main camera and the distance D between the main camera and the object. For example, it is possible to use a mathematical formula which expresses processing for increasing the view angle $\theta_a$ of the slave camera a until the object obj imaged by the main camera m is within the area which can be imaged by the slave camera a.

[Third Embodiment]

In the first and second embodiments, explanation has been described on an example in which the view angles of the plurality of cameras constituting the omnidirectional camera 1 are controlled assuming that the object is stationary. In the present embodiment, explanation will be made on an example in which the view angles are controlled in a case where the plurality of cameras constituting the omnidirectional camera 1 image a moving object. In the omnidirectional camera 1 of the present embodiment, the plurality of cameras can capture the moving object, and accordingly, it is possible to image the moving object as a moving image. Incidentally, explanation of portions common to the first to third embodiments will be simplified or omitted, and explanation will be mainly made below on points unique to the present embodiment.

<Method for Deriving a View Angle>

Figure 14:
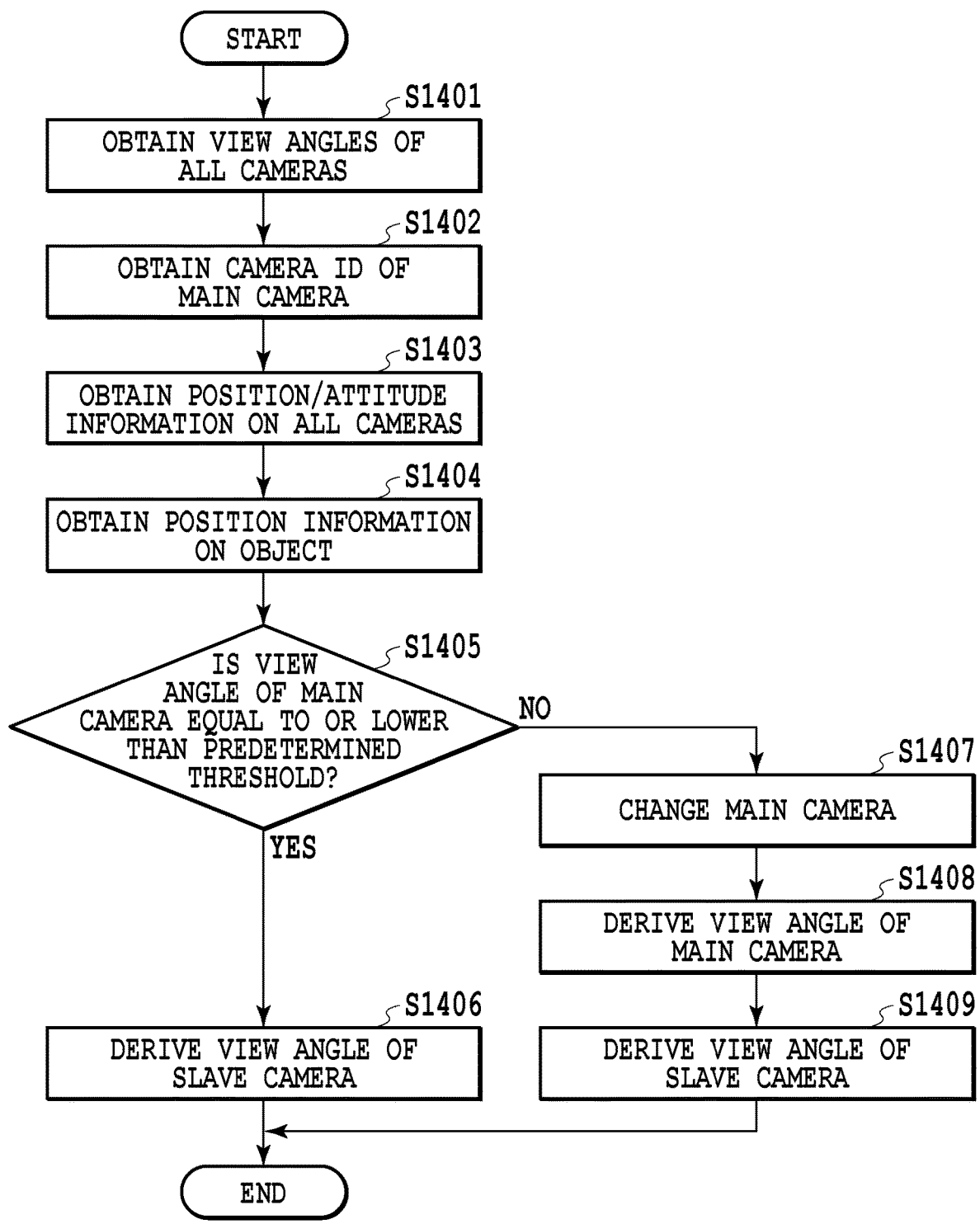
FIG. 14 is a flowchart showing processing for deriving a view angle according to a third embodiment.

FIG. 14 is a flowchart showing processing for deriving the view angle of the slave camera according to the present embodiment. With reference to the flowchart shown in FIG. 14, explanation will be made on processing in which the PC 200 derives the view angle of the slave camera in order to generate a wide-view-angle image including the moving object while imaging the object with high definition. Incidentally, in the processing according to the flowchart shown in FIG. 14, the program code stored in the ROM 206 is loaded in the RAM 207, and executed by the CPU 205.

Processing in S1401 to S1403 is identical to processing in S1201 to S1203 in the second embodiment, and their explanation will be omitted.

Figure 15:
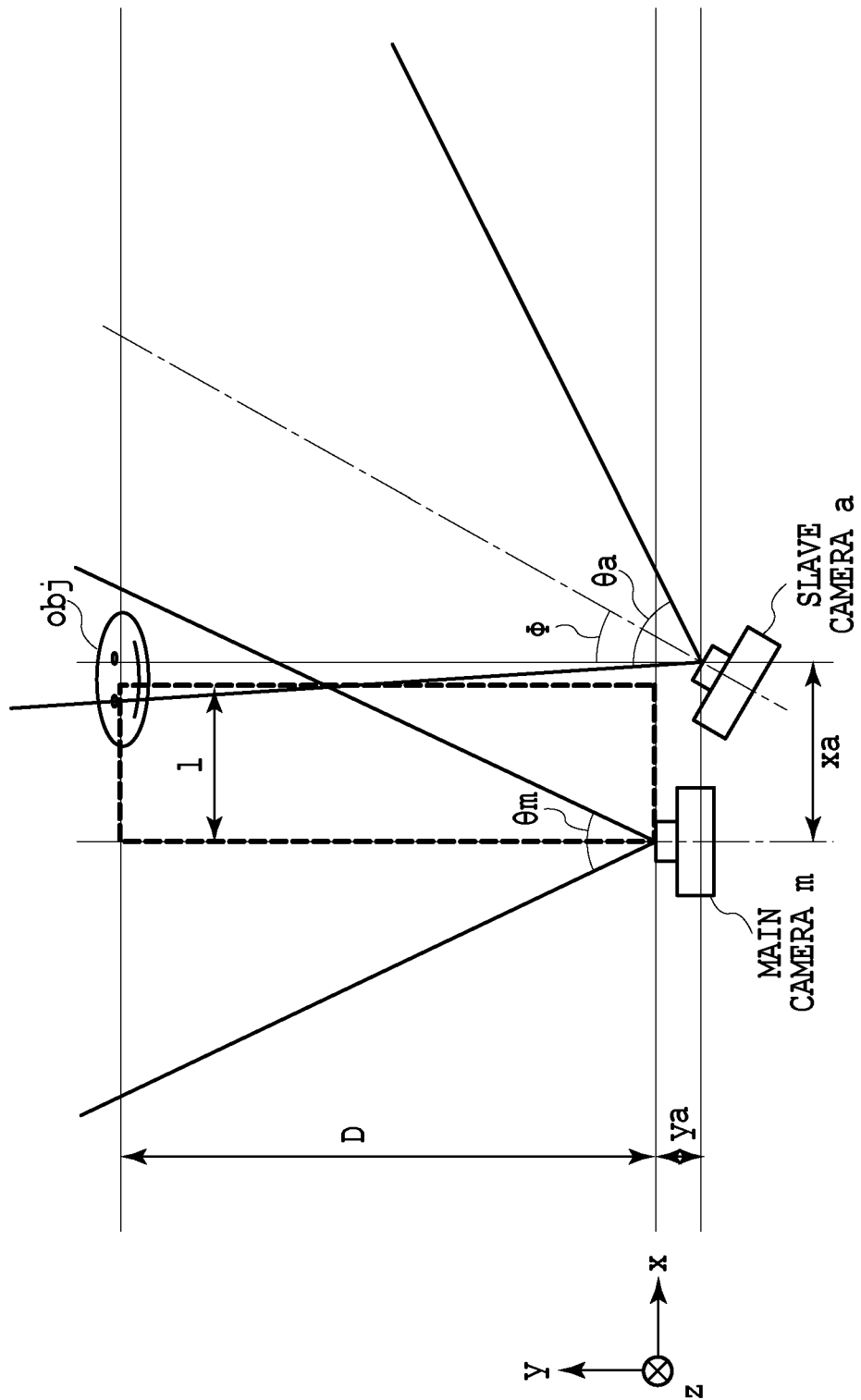
FIG. 15 is a schematic diagram showing an example of a positional relationship between an object and cameras according to the third embodiment.

In S1404, the view angle deriving unit 201 obtains the relative positions of the main camera and the object captured by the main camera. As a specific method for obtaining the positions, a publicly-known method can be used, and for example, the positions can be obtained by emitting an infrared laser for measuring the positions from the main camera to the object and receiving a reflection from the object. FIG. 15 shows a positional relationship among the object, the main camera, and the slave camera in a case where the cameras are positioned on a predetermined circumference (FIG. 1). In FIG. 15, D is a distance between the main camera m and the object obj in the direction of the y-axis, l is a distance between the optical axis of the main camera m and the object obj in the direction of the x-axis, θm is the view angle of the main camera m, and θa is the view angle of the slave camera a.

In S1405, the view angle deriving unit 201 determines the position of the object obj. For example, let's assume that the relationship between the relative positions of the object obj and the main camera m is the one shown in FIG. 15. On this occasion, the view angle θm can be derived from the following formula.

$$\theta_m = 2\tan^{-1}\left(\frac{l}{D}\right) \quad \text{Formula (5)}$$

In a case where it is determined that θm calculated from the above mathematical formula is equal to or smaller than a predetermined threshold (S1405: YES), that is, in a case where it is determined that the main camera m captures the object obj at the view angle θm, the process proceeds to S1406. On the other hand, in a case where it is determined that θm is larger than the predetermined threshold (S1405: NO), that is, in a case where it is determined that the object obj which was captured by the main camera m is not in an area which can be captured by the main camera m at the view angle θm, the process proceeds to S1407. In the present embodiment, in S1405, the view angle θm of the main camera m is determined by using the predetermined threshold, but a value to be compared with the predetermined threshold is not limited to this. For example, it is possible to compare the predetermined threshold with an angle formed by the optical axis of the main camera, the center of the omnidirectional camera 1, and the position of the object obj.

In S1406, the view angle deriving unit 201 derives the view angle θa of the slave camera a. As in the second embodiment, the x-axis is an axis which is perpendicular to the optical axis of the main camera m and which is horizontal to the ground contact surface, the y-axis is in the direction of the optical axis, and the z-axis is an axis which is perpendicular to the optical axis and which is perpendicular to the ground contact surface. Further, the coordinates of the main camera m are (xm, ym, zm), and the coordinates of the slave camera a are (xm+xa, ym−ya, zm). The rotational coordinates of the main camera m in the xyz three-dimensional space coordinates are (0, 0, 0), and the rotational coordinates of the slave camera a are (0, 0, φ). The view angle θa of the slave camera a is derived as a value satisfying the following formula.

$$D\tan\frac{\theta_m}{2} + (D + y_a)\tan\left(\frac{\theta_a}{2} - \phi\right) - l > Th \therefore \quad \text{Formula (6)}$$

$$\theta_a > 2\phi + 2\tan^{-1}\left(\frac{Th + l - D\tan\frac{\theta_m}{2}}{D + y_a}\right)$$

Incidentally, Th is a threshold, and in the present embodiment, Th is a threshold for determining how much a given area of the object obj captured by the main camera m overlaps a given area of the object obj captured by the slave camera a. The view angle deriving unit 201 outputs the view angle derived in S1406 to the slave camera. The control unit 107 of the slave camera performs control so that the view angle of the slave camera becomes the view angle received by the optical unit 101.

On the other hand, in a case where it is determined that θm is larger than the predetermined threshold (S1405: NO), the view angle deriving unit 201 changes the main camera in S1407. In S1407, the slave camera which is adjacent to the main camera and which is closest to the object is changed to the main camera based on the position of the object obtained in S1404. In the following example, explanation will be made on a case where the slave camera a is changed to the main camera a and the main camera m is changed to the slave camera m.

In S1408, the view angle deriving unit 201 derives the view angle of the main camera a. The view angle θa of the main camera a can be derived from the following formula.

$$\theta_a = 2\tan^{-1}\left(\frac{x_a - l}{D + y_a}\right) + \phi \quad \text{Formula (7)}$$

In S1409, the view angle deriving unit 201 derives the view angle θm of the slave camera m. The view angle θm of the slave camera m can be derived from the following formula.

$$D'\tan\frac{\theta_a}{2} + (D' + y_a)\tan\left(\frac{\theta_m}{2} - \phi\right) - l' > Th \therefore \quad \text{Formula (8)}$$

$$\theta_m > 2\phi + 2\tan^{-1}\left(\frac{Th + l' - D'\tan\frac{\theta_a}{2}}{D' + y_a}\right)$$

Incidentally, D' is a distance between the main camera a and the object in a direction parallel to the optical axis, and l' is a distance between the optical axis of the main camera a and the object obj in a perpendicular direction. Further, as in the first and second embodiments, Th is a threshold, and in the present embodiment, Th is a threshold for determining how much a given area of the object obj captured by the main camera a overlaps a given area of the object obj captured by the slave camera m. The view angle deriving unit 201 outputs the view angle derived in S1409 to the slave camera. The control unit 107 of the slave camera performs control so that the view angle of the slave camera becomes the view angle received by the optical unit 101.

As explained above, as in the first and second embodiments, the omnidirectional camera 1 of the present embodiment can suppress generation of an area which cannot be imaged and generate a wide-view-angle image including part of the object which can be imaged with high definition by controlling the view angle of the slave camera. Further, the omnidirectional camera 1 of the present embodiment switches between the main camera for capturing the object and the slave camera according to the position of the object. Even in a case where the object moves, it is possible to suppress generation of an area which cannot be imaged, and generate a wide-view-angle image including part of the object which is imaged with high definition by switching between the main camera and the slave camera to capture the object.

[Fourth Embodiment]

In the first to third embodiments, explanation has been made on the example in which the object is a single object and the view angles of the plurality of cameras constituting the omnidirectional camera 1 are controlled. In the present embodiment, explanation will be made on control of view angles in a case where a plurality of objects exist, and a plurality of main cameras image different objects. Incidentally, explanation of portions common to the first to fourth embodiments will be simplified or omitted, and explanation will be mainly made below on points unique to the present embodiment.

<Method for Deriving a View Angle>

Figure 16:
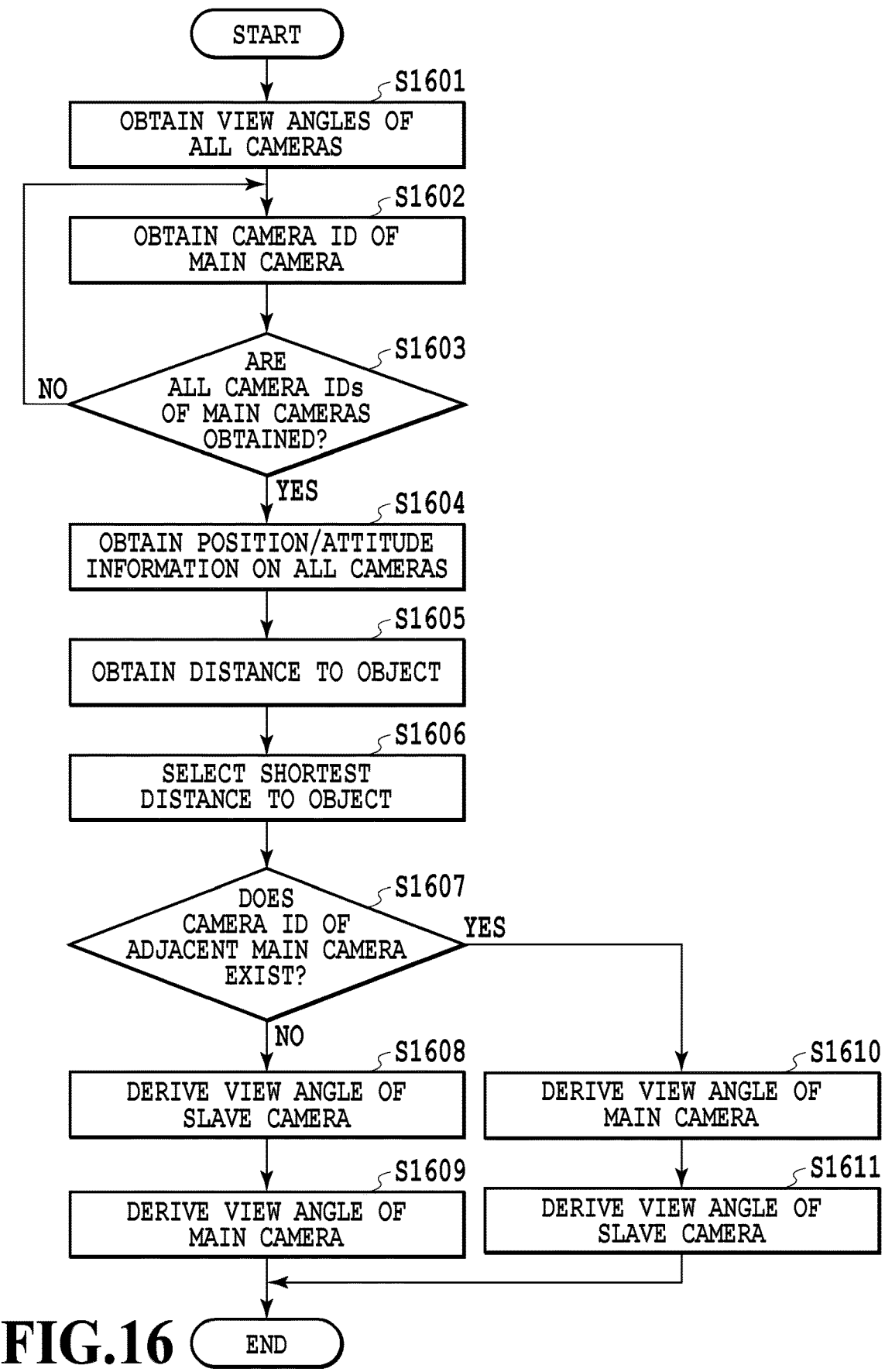
FIG. 16 is a flowchart showing processing for deriving a view angle according to a fourth embodiment.

FIG. 16 is a flowchart showing processing for deriving the view angles of the slave camera and the main cameras according to the present embodiment. With reference to the flowchart shown in FIG. 16, explanation will be made on processing in which the PC 200 derives the view angles of the slave camera and the main cameras in order to image the different objects with high definition by the plurality of main cameras and generate a wide-view-angle image. Incidentally, in the processing according to the flowchart shown in FIG. 16, program code stored in the ROM 206 is loaded in the RAM 207, and executed by the CPU 205.

Processing in S1601 and S1602 is identical to processing in S1201 and S1202 in the second embodiment, and their explanation will be omitted.

In S1603, the view angle deriving unit 201 determines whether all the camera IDs of the main cameras are obtained. In a case where all the camera IDs of the main cameras are obtained (S1603: YES), the process proceeds to S1604. On the other hand, in a case where not all the camera IDs of the main cameras are obtained (S1603: NO), the process returns to S1602, and the obtainable camera ID of the main camera is retrieved.

Processing in S1604 is identical to processing in S1203 in the second embodiment, and its explanation will be omitted.

In S1605, the view angle deriving unit 201 obtains distances between the main cameras and different objects captured by the main cameras. A method for obtaining the distances between the main cameras and the objects is identical to the processing in S1204 in the second embodiment, and its explanation will be omitted.

In S1606, the view angle deriving unit 201 selects the shortest distance among the distances obtained in S1605. In an example shown in FIG. 17, a distance Dm between the main camera m and an object obj1 is compared with a distance Db between a main camera b and an object obj2. In this example, since the distance Db is shorter, the distance Db is selected as the shortest distance.

In S1607, the view angle deriving unit 201 determines whether the camera ID of an adjacent main camera exists. The processing in S1607 is processing for determining whether there exists a group of adjacent main cameras for capturing different objects in the omnidirectional camera 1 as shown in, for example, FIG. 17. For example, the view angle deriving unit 201 selects the camera IDs of the main cameras obtained in S1602 in the increasing order of the number of the camera ID. Then it is determined whether the ID of a camera adjacent to the selected main camera is a camera ID designated for a main camera. In a case where the camera ID of the adjacent main camera does not exist (S1607: NO), the process proceeds to S1608. On the other hand, in a case where the camera ID of the adjacent main camera exists (S1607: YES), the process proceeds to S1610.

Figure 17:
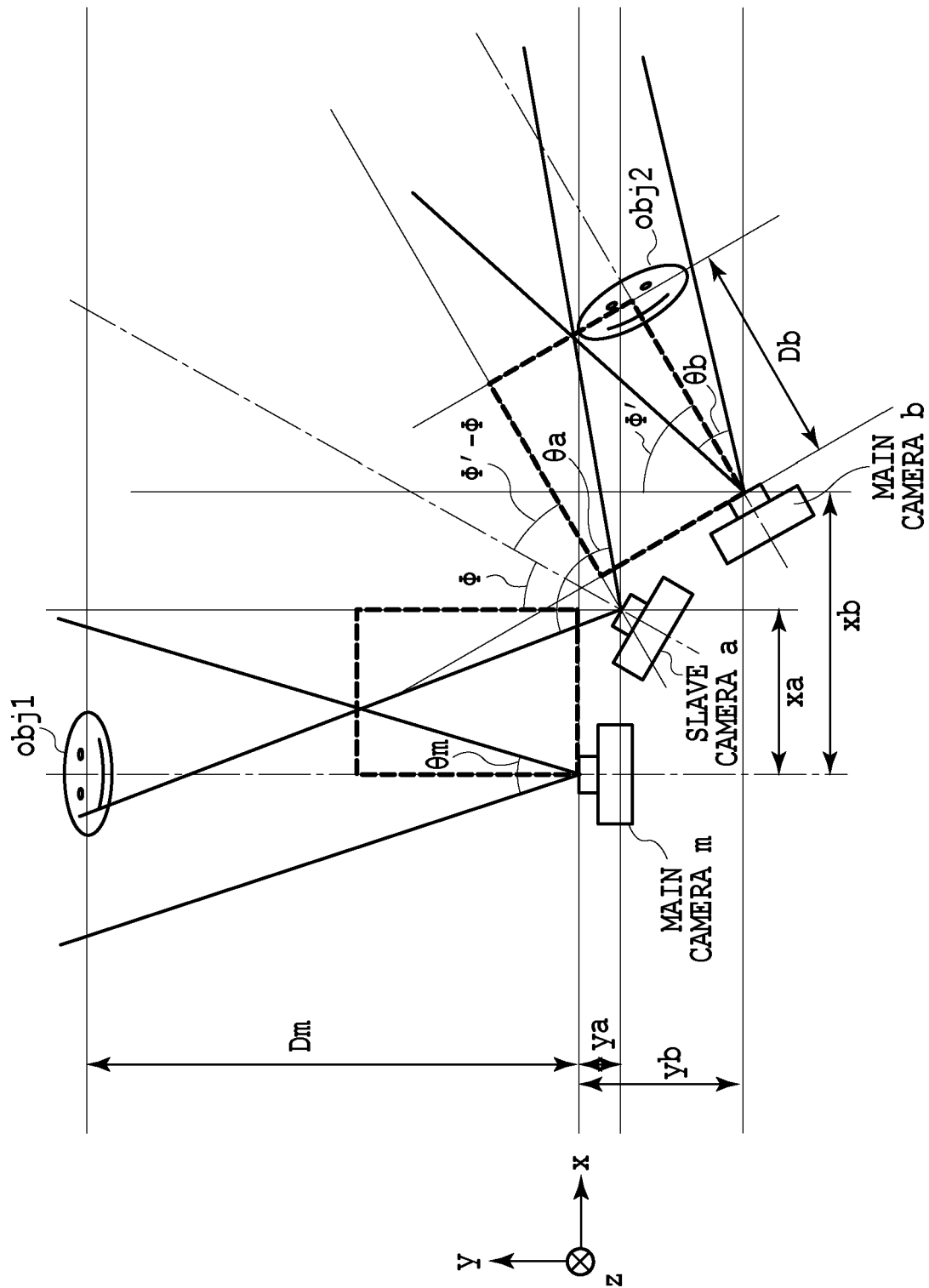
FIG. 17 is a schematic diagram showing an example of a positional relationship between objects and cameras according to the fourth embodiment.

In S1608, the view angle deriving unit 201 derives the view angle of the slave camera a between the main camera m and the main camera b. FIG. 17 shows a positional relationship between the objects and the main cameras in a case where the cameras are positioned on a predetermined circumference (FIG. 1). As shown in FIG. 17, the main cameras are not adjacent to each other, and the slave camera is positioned between the main cameras.

The two main cameras are referred to as the main camera m and the main camera b, and one slave camera positioned between the main camera m and the main camera b is referred to as the slave camera a. For example, θm is the view angle of the main camera m, θb is the view angle of the main camera b, and θa is the view angle of the slave camera a. Further, the x-axis is an axis which is perpendicular to the optical axis of the main camera m and which is horizontal to the ground contact surface, the y-axis is in the direction of the optical axis, and the z-axis is an axis which is perpendicular to the optical axis and which is perpendicular to the ground contact surface. Furthermore, the coordinates of the main camera m are (xm, ym, zm), the coordinates of the slave camera a are (xm+xa, ym−ya, zm), and the coordinates of the main camera b are (xm+xb, ym−yb, zm). The rotational coordinates of the main camera m in the xyz three-dimensional space coordinates are (0, 0, 0), the rotational coordinates of the slave camera a are (0, 0, φ), and the rotational coordinates of the main camera b are (0, 0, φ'). The view angle θa of the slave camera a is derived as a value satisfying the following formula so that the main camera m and the main camera b can zoom in on the objects and generate a wide-view-angle image.

$$D_b \tan\frac{\theta_b}{2} + (D_b + (y_b - y_a)\sin(\frac{\pi}{2} - \phi'))\tan(\frac{\theta_a}{2} - (\phi' - \phi)) - \quad \text{Formula (9)}$$

$$x_b > th \therefore$$

$$\theta_a > 2(\phi' - \phi) + 2\tan^{-1}\left(\frac{Th - D_b\tan\frac{\theta_b}{2} + x_b}{D_b + (y_b - y_a)\sin(\frac{\pi}{2} - \phi')}\right)$$

Incidentally, Th is a threshold, and in the present embodiment, Th is a threshold for determining how much a given area of the object obj2 captured by the main camera b overlaps a given area of the object obj2 captured by the slave camera a. The view angle deriving unit 201 outputs the view angle derived in S1608 to the slave camera. The control unit 107 of the slave camera performs control so that the view angle of the slave camera becomes the view angle received by the optical unit 101.

In S1609, the view angle deriving unit 201 derives the image angle of the main camera. In the first embodiment, explanation has been made on the mode in which the view angle of the main camera is set via the input unit 209 of the PC 200. Accordingly, in S1609, there is a case where the view angle θa of the main camera for capturing the object obj1 and the view angle θa of the main camera for capturing the object obj2 are set at different view angles. In the present embodiment, the view angle of the main camera capturing the object at the shortest distance is set as the view angles of the main cameras corresponding to all the camera IDs obtained in S1602. In the example shown in FIG. 17, the view angle deriving unit 201 sets the view angles of the main cameras in the omnidirectional camera 1 so that θm=θb.

As explained above, the view angle deriving unit 201 derives the view angle θa of the slave camera a by referring to the distance Db, which is the shortest distance between the main camera and the object. This is because as the distance between the main camera and the object becomes shorter, it is necessary to set the view angle of the slave camera adjacent to the main camera at a larger value. In the example shown in FIG. 17, since the view angle θa of the slave camera a is derived based on the distance Db, which is the shortest distance, the slave camera a can capture both the object obj1 captured by the main camera m and the object obj2 captured by the main camera b. Accordingly, the omnidirectional camera 1 of the present embodiment can generate a wide-view-angle image without lacking an image. Further, in processing for enlarging or reducing a taken image according to the present embodiment (S504), an enlargement/reduction rate S is calculated based on the view angle (θa) of the slave camera derived in S1608 and the view angle (θb) of the main camera set in S1609. The view angle deriving unit 201 outputs the view angles derived in S1608 and S1609 to the main cameras and slave camera. The control units 107 of the main cameras and the slave camera perform control so that the view angles of the main cameras and the slave camera are view angles received by the optical unit 101.

Figure 18:
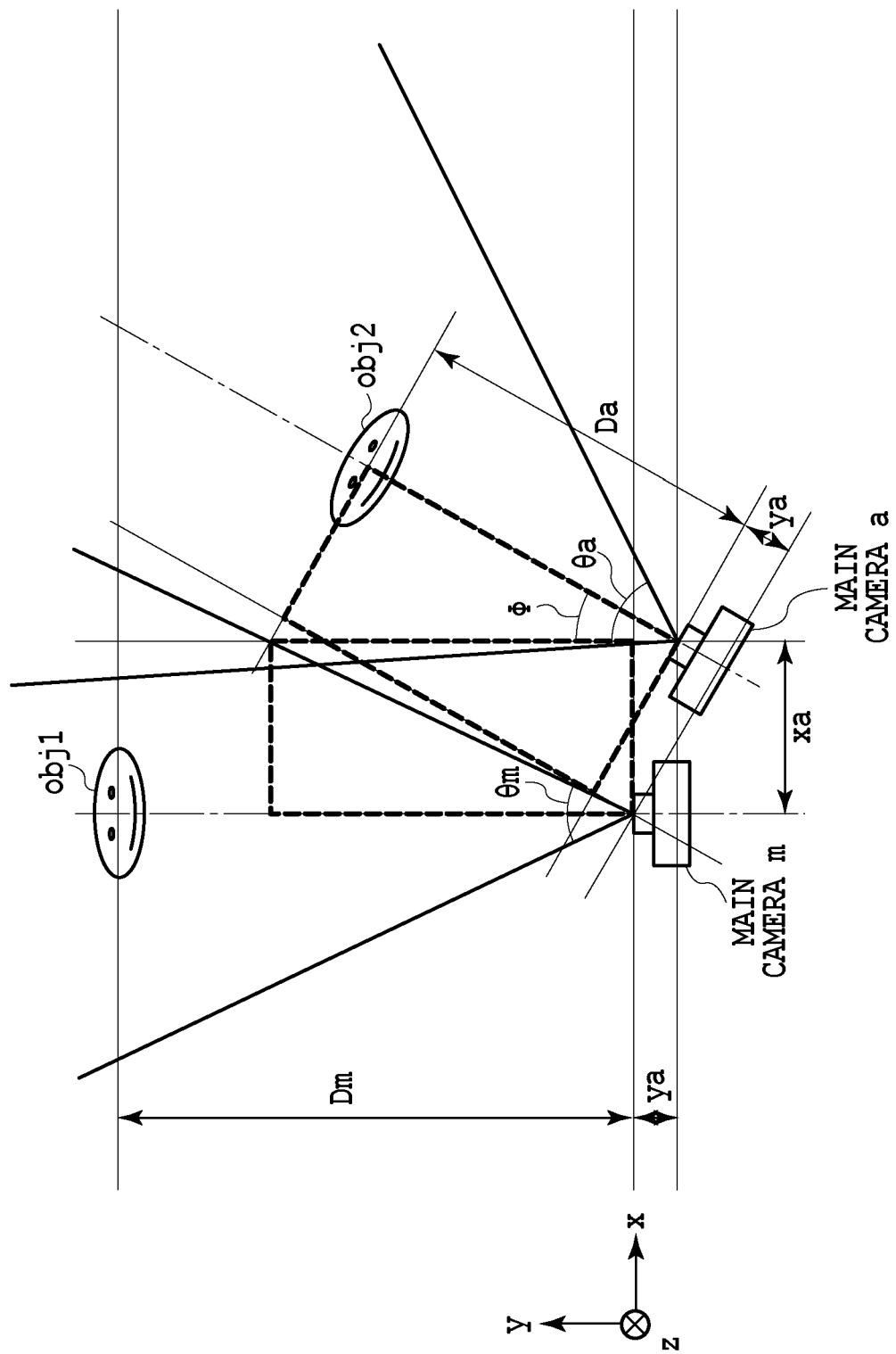
FIG. 18 is a schematic diagram showing an example of a positional relationship between objects and cameras according to the fourth embodiment.

On the other hand, in a case where the camera ID of the adjacent main camera exists (S1607: YES), in S1610, the view angle deriving unit 201 derives the view angle of the main camera. FIG. 18 shows a positional relationship between the objects and the main cameras in a case where the cameras are positioned on a predetermined circumference (FIG. 1). As shown in FIG. 18, for example, the two main cameras are adjacent to each other. The two main cameras are referred to as the main camera m and the main camera a. θm is the view angle of the main camera m, θa is the view angle of the main camera a, Dm is the distance between the main camera m and the object obj1, and Da is a distance between the main camera a and the object obj2. Further, the x-axis is an axis which is perpendicular to the optical axis of the main camera m and which is horizontal to the ground contact surface, the y-axis is in the direction of the optical axis, and the z-axis is an axis which is perpendicular to the optical axis and which is perpendicular to the ground contact surface. Furthermore, the coordinates of the main camera m in the xyz three-dimensional space coordinates are (xm, ym, zm), and the coordinates of the main camera a are (xm+xa, ym−ya, zm). Likewise, the rotational coordinates of the main camera m in the xyz three-dimensional space coordinates are (0, 0, 0), and the rotational coordinates of the main camera a are (0, 0, φ). In a case where the main camera m and the main camera a are adjacent to each other, the view angle deriving unit 201 derives the view angles θm and θa satisfying the following formula so that the resolution of each object is at a similar level.

$$D_m \tan\frac{\theta_m}{2} = D_a \tan\frac{\theta_a}{2} \qquad \text{Formula (10)}$$

and $$\begin{cases} D_m \tan\frac{\theta_m}{2} + (D_a + y_a)\tan\left(\frac{\theta_a}{2} - \phi\right) - x_a > Th \\ \qquad\qquad\text{or} \\ D_a \tan\frac{\theta_a}{2} + (D_a + y_a)\tan\left(\frac{\theta_m}{2} - \phi\right) - x_a > Th \end{cases}$$

Incidentally, the above explanation has been made on the view angles θm and θa of the main cameras m and a capturing the different objects obj1 and obj2, respectively. The omnidirectional camera 1 of the present embodiment may have a mode in which three or more main cameras are adjacent to one another, and may have a mode in which there exist two or more groups of adjacent main cameras. Or as in S1609, the view angle deriving unit 201 may set the view angle of the main camera in the omnidirectional camera 1 so that θm=θb.

In S1611, the view angle deriving unit 201 derives the view angle of the slave camera positioned together with the main camera m and the main camera a in the omnidirectional camera 1. The processing in S1611 is identical to the processing in S1608 of the present embodiment, and its explanation will be omitted. In S1611 as in the processing in S1608, the view angle of the slave camera is derived by referring to the shortest distance between the main camera and the object. Further, in the processing for enlarging or reducing a taken image according to the present embodiment (S504), an enlargement/reduction rate S is calculated based on the view angle of the main cameras capturing the objects at the shortest distance and the view angle of the slave camera derived in S1611. The view angle deriving unit 201 outputs the view angles derived in S1610 and S1611 to the main cameras and the slave camera. The control units 107 of the main cameras and the slave camera perform control so that the view angles of the main cameras and the slave camera are view angles received by the optical unit 101.

As explained above, even in a case where the plurality of main cameras image the different objects, the omnidirectional camera 1 of the present embodiment can suppress generation of an area which cannot be imaged and generate a wide-view-angle image including part of the object which is imaged with high definition.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The control apparatus of the present invention can suppress generation of an area which cannot be imaged and control the view angles of the plurality of cameras.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-172117, filed Sep. 1, 2015, which is hereby incorporated by reference wherein in its entirety.

What is claimed is:

1. A control apparatus for controlling view angles of at least two of a plurality of cameras arranged directed toward different directions for capturing a predetermined wide-view-angle image, in which the plurality of cameras are included in an image capturing system, the control apparatus comprising:
one or more processors; and
a memory having stored thereon instructions, which, when executed by the one or more processors, cause the control apparatus to:
change a view angle corresponding to a first camera out of the plurality of cameras to a first view angle;
derive a view angle at which a second camera can image an area which cannot be imaged by any of the plurality cameras using the first view angle and an angle between an optical axis of the first camera and an optical axis of the second camera as a second view angle of the second camera in a case where, by changing the view angle of the first camera, an area which cannot be imaged by any of the plurality cameras in the predetermined wide-view-angle is generated, wherein the second camera is different from the first camera out of the plurality of cameras; and
cause the first camera to perform imaging by using the first view angle and the second camera to perform imaging by using the second view angle.

2. The control apparatus according to claim 1, wherein the instructions, when executed by the one or more processors, further cause the control apparatus to:
store position/attitude information for specifying a position and attitude of each of the plurality of cameras; and
obtain a distance from the first camera to an object of interest, the first camera being a main camera for capturing the object of interest,
wherein the second view angle of the second camera is derived based on the first view angle of the first camera, the position/attitude information, and the distance from the first camera to the object.

3. The control apparatus according to claim 2, wherein the instructions, when executed by the one or more processors, cause the control apparatus to derive the second view angle so that a given area of the object captured by the first camera at the first angle overlaps a given area of the object captured by the second camera at the second view angle.

4. The control apparatus according to claim 2, wherein the instructions, when executed by the one or more processors, further cause the control apparatus to:
obtain relative positions of the first camera and the object; and
change the second camera which is adjacent to the first camera and which is closest to the object to the first camera in a case where the object which was captured by the first camera is outside an area which can be captured by the first camera at the first view angle,
wherein the instructions, when executed by the one or more processors, cause the control apparatus to:
derive the first view angle of the changed first camera based on the position/attitude information and the relative positions of the changed first camera and the object; and
derive the second view angle of the second camera adjacent to the changed first camera based on the first view angle of the changed first camera, the position/attitude information, and the distance from the changed first camera to the object.

5. The control apparatus according to claim 2,
wherein the instructions, when executed by the one or more processors, cause the control apparatus to:
obtain a plurality of the distances to the objects captured by a plurality of main cameras;
select a shortest distance from the plurality of obtained distances;
set the first view angle of the camera which corresponds to the selected shortest distance to a first view angle of another main camera out of the plurality of main cameras; and
derive the second view angle of the second camera based on the first view angles, the position/attitude information, and the selected shortest distance.

6. The control apparatus according to claim 1, wherein the instructions, when executed by the one or more processors, further cause the control apparatus to obtain one or more images taken at the first view angle and one or more images taken at the derived second view angle, and generate a wide-view-angle image from a group of the obtained images.

7. The control apparatus according to claim 6,
wherein the instructions, when executed by the one or more processors, further cause the control apparatus to:
convert the one or more images taken at the derived second view angle according to an enlargement/reduction rate specified by the first view angle and the second view angle; and
combine the one or more images taken at the first view angle and the one or more converted images.

8. The control apparatus according to claim 7, wherein a ratio of the first view angle to the second view angle is used as the enlargement/reduction rate.

9. A control method for controlling view angles of at least two of a plurality of cameras arranged directed toward different directions for capturing a predetermined wide-view-angle image, in which the plurality of cameras are included in an image capturing system, the control method comprising:

changing a view angle corresponding to a first camera out of the plurality of cameras to a first view angle;

deriving a view angle at which a second camera can image an area which cannot be imaged by any of the plurality cameras using the first view angle and an angle between an optical axis of the first camera and an optical axis of the second camera as a second view angle of the second camera in a case where, by changing the view angle of the first camera, an area which cannot be imaged by any of the plurality cameras in the predetermined wide-view-angle is generated, wherein the second camera is different from the first camera out of the plurality of cameras; and causing the first camera to perform imaging by using the first view angle and the second camera to perform imaging by using the second view angle.

10. A non-transitory computer readable storage medium storing a program for causing a computer to function as a control apparatus for controlling view angles of at least two of a plurality of cameras arranged directed toward different directions for capturing a predetermined wide-view-angle image, in which the plurality of cameras are included in an image capturing system, wherein the control apparatus comprises:

one or more processors; and a memory having stored thereon instructions, which, when executed by the one or more processors, cause the control apparatus to:

change a view angle corresponding to a first camera out of the plurality of cameras to a first view angle;

derive a view angle at which a second camera can image an area which cannot be imaged by any of the plurality cameras using the first view angle and an angle between an optical axis of the first camera and an optical axis of the second camera as a second view angle of the second camera in a case where, by changing the view angle of the first camera, an area which cannot be imaged by any of the plurality cameras in the predetermined wide-view-angle is generated, wherein the second camera is different from the first camera out of the plurality of cameras; and cause the first camera to perform imaging by using the first view angle and the second camera to perform imaging by using the second view angle.

* * * * *